US010850421B2

(12) United States Patent
Puntoni

(10) Patent No.: US 10,850,421 B2
(45) Date of Patent: Dec. 1, 2020

(54) ROTATABLE BLADE WITH REPLACEABLE CUTTING EDGES

(71) Applicant: Puntoni Products LLC, Heyworth, IL (US)

(72) Inventor: Patrick G. Puntoni, Heyworth, IL (US)

(73) Assignee: Puntoni Products LLC, Heyworth, IL (US)

( * ) Notice: Subject to any disclaimer, the term of this patent is extended or adjusted under 35 U.S.C. 154(b) by 0 days.

(21) Appl. No.: 16/729,301

(22) Filed: Dec. 28, 2019

(65) Prior Publication Data

US 2020/0130219 A1 Apr. 30, 2020

Related U.S. Application Data

(63) Continuation-in-part of application No. PCT/US2018/039881, filed on Jun. 28, 2018.

(60) Provisional application No. 62/913,722, filed on Oct. 10, 2019, provisional application No. 62/525,847, filed on Jun. 28, 2017.

(51) Int. Cl.

| | |
|---|---|
| ***A01D 34/00*** | (2006.01) |
| ***B26D 7/26*** | (2006.01) |
| ***B26D 1/28*** | (2006.01) |
| ***B26D 1/00*** | (2006.01) |

(52) U.S. Cl.

CPC ......... *B26D 7/2614* (2013.01); *B26D 1/0006* (2013.01); *B26D 1/28* (2013.01); *B26D 2001/0046* (2013.01); *B26D 2001/0053* (2013.01)

(58) Field of Classification Search

USPC ... 56/229, 77.5, 255, 295, DIG. 19, DIG. 20
See application file for complete search history.

(56) References Cited

U.S. PATENT DOCUMENTS

| | | | | |
|---|---|---|---|---|
| 2,869,311 A * | 1/1959 | Beeston, Jr. | A01D 34/73 | 56/295 |
| 3,769,784 A * | 11/1973 | Jones | A01D 34/73 | 56/295 |
| 5,018,347 A * | 5/1991 | Feilen | A01D 34/733 | 30/335 |
| 5,274,987 A * | 1/1994 | Wiener | A01D 34/001 | 192/50 |
| 5,383,329 A * | 1/1995 | Cornell | A01D 34/73 | 56/255 |
| 2003/0182918 A1* | 10/2003 | Stone | A01D 34/73 | 56/255 |
| 2006/0168933 A1* | 8/2006 | Hill, Jr. | A01D 34/73 | 56/295 |
| 2012/0110970 A1* | 5/2012 | Blarek | A01D 34/73 | 56/295 |
| 2017/0079206 A1* | 3/2017 | Wills | A01D 34/733 | |

* cited by examiner

*Primary Examiner* — Thomas B Will
*Assistant Examiner* — Mai T Nguyen
(74) *Attorney, Agent, or Firm* — Incubate IP; Randy R. Micheletti

(57) ABSTRACT

The present disclosure provides rotatable blades with easily replaceable cutting edges, and methods of making and using same.

17 Claims, 12 Drawing Sheets

ROTATABLE BLADE WITH REPLACEABLE CUTTING EDGES

PRIORITY CLAIM

This Application claims the benefit of PCT Patent Application Serial No. PCT/US18/39881, filed Jun. 28, 2018, which claims priority to U.S. Provisional Patent Application Ser. No. 62/525,847, filed on Jun. 28, 2017; and claims priority to U.S. Provisional Patent Application Ser. No. 62/913,722, filed Oct. 10, 2019, the entire contents of each of which are incorporated herein by reference and relied upon.

BACKGROUND

Rotatable blades used on mowers and other cutting machines are generally made from a single piece with the rotatable blade having one or more section of the rotatable blade sharpened to form a cutting edge to perform the cutting action that the rotatable blade was designed to do. The cutting edges on rotatable blades used on mowers and other cutting machines are considered a wear area and require routine sharpening. Single-piece rotatable blades can also lose shape, dimension, and balance due to material removal after multiple resharpenings which can change the operating performance after sharpening when compared to when it was new.

Sharpening rotatable blade cutting edges usually requires removal and re-installation of the entire rotatable blade from the cutting machine. This process can be considerably difficult to do and can require a lot of time and effort, and can be dangerous. The time requirements and the cost incurred to either sharpen or replace the entire rotatable blade can be substantial.

Known rotatable blades with replaceable cutting edges do not enable efficient and economical use due to their complexity. Special processes or tooling is generally required, which significantly limits their utility.

A need persists for improved rotatable blades with convenient and economical replaceable cutting edges.

SUMMARY

The present disclosure provides rotatable cutting blades with replaceable cutting edges that can withstand the same forces and loads encountered by a single-piece rotatable cutting blade, can easily be replaced, and be economically feasible to replace the cutting edges without having to replace the entire rotatable blade or dismount the rotatable blade for sharpening. Devices consistent with this disclosure allow for quick and economical replacement of cutting edges but has the flexibility to be used and is adaptable for the many different rotatable blade design configurations currently used in the marketplace. The replaceable cutting edges can be easily separated during the replacement procedure by using a tool or wedge to pry the replaceable cutting edges loose from the cutting blade assembly using the aligned cutouts in both the retainer bracket and replaceable cutting edge. Said replacement cutting edges can only be assembled one way to promote safety during replacement and operation. Rotatable blades consistent with the present disclosure are useful for a variety of mower applications, including riding or walk-behind lawn mower blades, industrial rotary cutter blades, flail-type knife blades, and flail-type hammer blades.

In some embodiments, the present disclosure provides a rotatable blade comprising a blade body having an axis of rotation, a first long edge, a second long edge opposite the first long edge, a first end portion, and a second end portion opposite the first end from the axis of rotation; and a first cutting edge removably associated with the first long edge and the first end portion.

In some embodiments, the present disclosure provides a method of improving performance of a rotatable cutting blade, the method comprising: un-mating the replaceable cutting edge(s) from the blade body; and mating new or re-sharpened replaceable cutting edge(s) to the blade body.

In some embodiments, the present disclosure provides a rotatable blade comprising: a carrier portion having a first long edge and a first end portion; and a replaceable cutting edge removably associated with the first long edge and the first end portion, the replaceable cutting edge comprising: a retaining slot disposed on a first longitudinal edge and configured to removably mate with the first long edge of the rotatable carrier portion, and a tapered cutting edge disposed along a second longitudinal edge opposite the first longitudinal edge.

In other embodiments, the present disclosure provides a rotatable carrier comprising: at least one inwardly-angled receiving slot disposed along a first edge and configured to receive an outwardly-angled finger of a replaceable cutting edge; optionally a removal slot configured to receive a pry tool; and at least one inwardly-angled finger disposed along the first edge and configured to reversibly mate with an outwardly-angled receiving slot of the replaceable cutting edge.

In still other embodiments, the present disclosure provides a replaceable cutting edge comprising: a tapered cutting edge disposed along a first longitudinal edge; a retaining slot along at least a portion of a second longitudinal edge opposite the first longitudinal edge and configured to reversibly mate with an edge of a rotatable carrier; and optionally a retaining mechanism notch disposed adjacent the second longitudinal edge and configured to reversibly receive a retaining mechanism.

These and other objects of the present technology will become readily apparent upon further review of the following detailed description, examples, and drawings.

DETAILED DESCRIPTION

Rotatable blades consistent with the present disclosure generally feature one or more replaceable cutting edges that mate with a rotatable carrier via an interlocking finger-like pattern. Such a design enables mating of replaceable cutting edge(s) with the rotatable blade body in a manner that minimizes or even prevents lateral shift of the replaceable cutting edge portion relative to the rotatable blade body portion during operation (e.g., in response to centrifugal forces).

The replaceable cutting edges can also be made of special material that is different than the rotatable blades, such as material with a higher Rockwell number than the rotatable blade material, to improve the wearability and service life of the replaceable cutting edges.

In some embodiments, a rotatable blade consistent with the present disclosure includes a single replaceable cutting edge. One or more of such rotatable blades may be attached about a circular mounting device to form a "flail" type blade assembly. In other embodiments, a rotatable blade consistent with the present disclosure includes two replaceable cutting edges separated by a mounting hole/axis of rotation. In other embodiments, a rotatable blade consistent with the present disclosure includes multiple replaceable cutting edges, each cutting edge disposed on one of multiple blade body sections, with each of the multiple blade body sections sharing a single common axis of rotation. In some embodiments, a rotatable blade consistent with the present disclosure includes n replaceable cutting edges, each cutting edge disposed on one of n blade body sections, with each of the n blade body sections sharing a single common axis of rotation.

Figure 1:
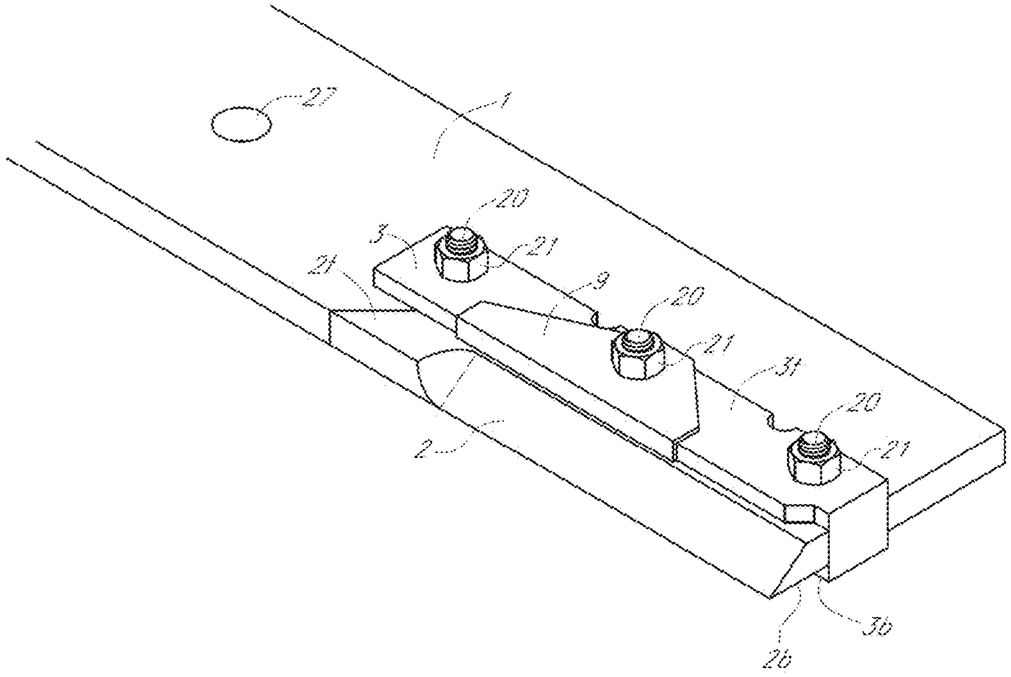
FIG. 1 shows a perspective view of a portion of a rotatable blade including replaceable cutting edges according to one embodiment of the present disclosure.

FIG. 1 shows one end of the assembly of the rotatable blade 1 with the replaceable cutting edge 2 held in place by the retainer bracket 3 which is bolted to the rotating blade 1 by attachment bolts 20 and nuts 21. The replaceable cutting edge retainer bracket spring 9 is held in place on top of the retainer bracket 3 by the bolt 20 and nut 21 in the center hole of the retainer bracket 3. The blade assembly rotates clockwise around the center axis and mounting hole 27.

Figure 1A:
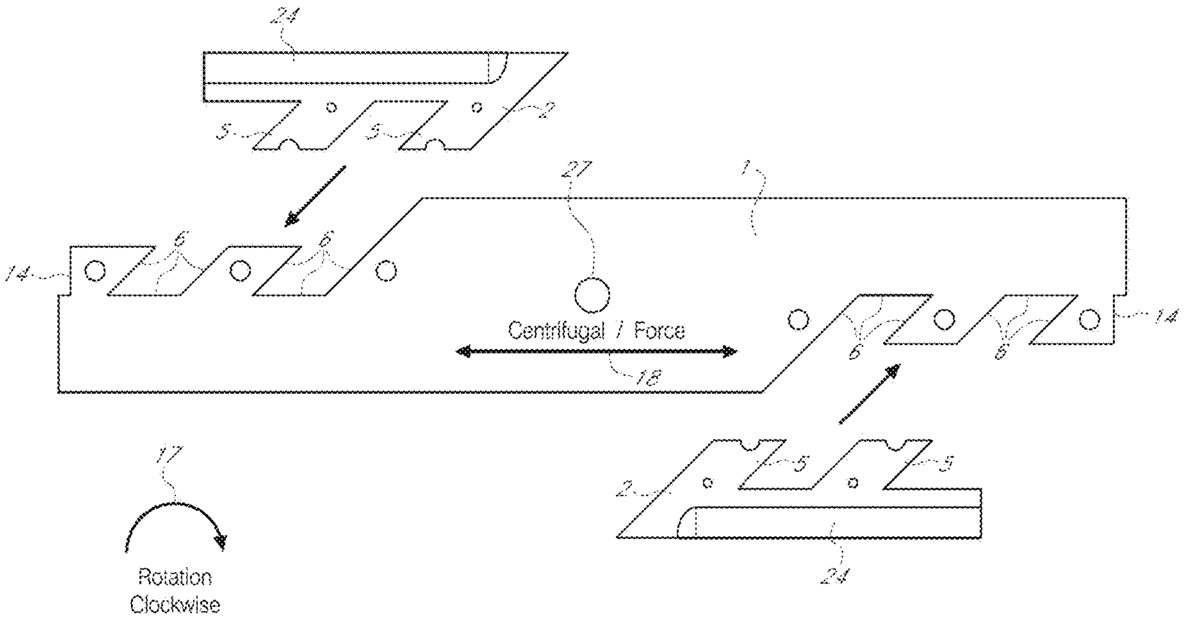
FIG. 1A shows a top plan view of the rotating blade of FIG. 1 including two generally opposed replaceable cutting edges.

FIG. 1A shows a top view of a rotatable blade 1 with replaceable cutting edges separated at both ends that rotates clockwise 17 around the axis of the rotating blade mounting hole 27 with the replaceable cutting edges 2 separated to illustrate how the outwardly angled slot pattern 6 formed on the rotatable blade 1 are angled in the direction of centrifugal force 18 to match up and mate with the outwardly angled finger pattern 5 formed on the replaceable cutting edges 2 angled in the same direction of centrifugal force 18. When the replaceable cutting edge 2 are slid together in the direction of the arrows where the two pieces are touching the rotatable blade 1 they together form one integral body like an individual piece of a jig-saw puzzle holds together with the cut pattern of the other touching pieces of the jig-saw puzzle to form a single piece of the entire jig-saw puzzle.

When slid together the outwardly angled finger pattern 5 on the replaceable cutting edges 2 mesh with the outwardly angled slot pattern 6 of the rotatable blade 1 to form a closely spaced union tightly held together under centrifugal force 18 created as the rotatable blade 1 rotates around the axis of the rotatable blade mounting hole 27. Replaceable cutting edges 2 used on certain designs of rotatable blades 1 may require an extension of the angled slot pattern 6 and finger pattern 5 that serves the same purpose and intent of said invention to accommodate longer or larger sizes of replaceable cutting edges 2. The simple pattern of the replaceable cutting edges 2 allows for the simple and economical manufacturing of the replaceable cutting edges 2 out of material that is similar in dimension and shape to the shape and area on the outside leading edges of the rotatable blade 1. Said replaceable cutting edges 2 are easy to manufacture without special tooling or a special manufacturing process can be made from the same material that the rotatable blade 1 is made from that allow for them to be produced in quantities that make their replacement economically feasible. The material composition of the replaceable cutting edges 2 may differ from the material composition of the rotatable blade 1 in order to have the replaceable cutting tips 2 made of a material that improves wear and durability. This pattern allows for this instant invention to be adaptable to work in many different rotating blade design and dimensional configurations currently used in the marketplace today for rotating blades today. FIG. 1A shows an embodiment wherein the rotatable blade 1 rotates in a clockwise direction 17. This instant invention is just as applicable to a rotating blade that turns in a counterclockwise direction by just reversing the clockwise directional sensitive design features and description criteria that are readily known by any person of ordinary skill in the pertinent art, science, area to accommodate the counterclockwise direction of a rotating blade intended to be used for the same objective of this invention. The retainer bracket notch 14 cut into the outside leading tip of the rotatable blade 1 provides a recess in the rotating bade where the retainer bracket 3 wraps around the rotating blade and prevents the retainer bracket 3 from extending past the outside edge of the rotatable blade 1.

Figure 2:
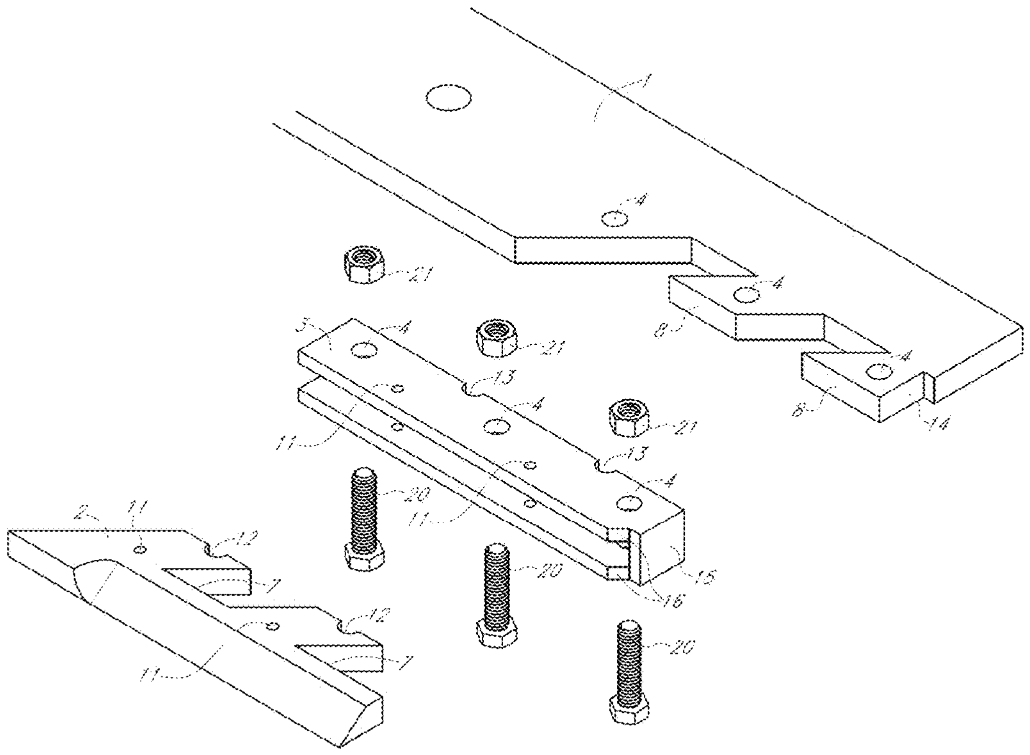
FIG. 2 shows an exploded perspective view of a portion of a rotatable blade including a replaceable cutting edge and associated retainer bracket according to one embodiment of the present disclosure.
Figure 3A:
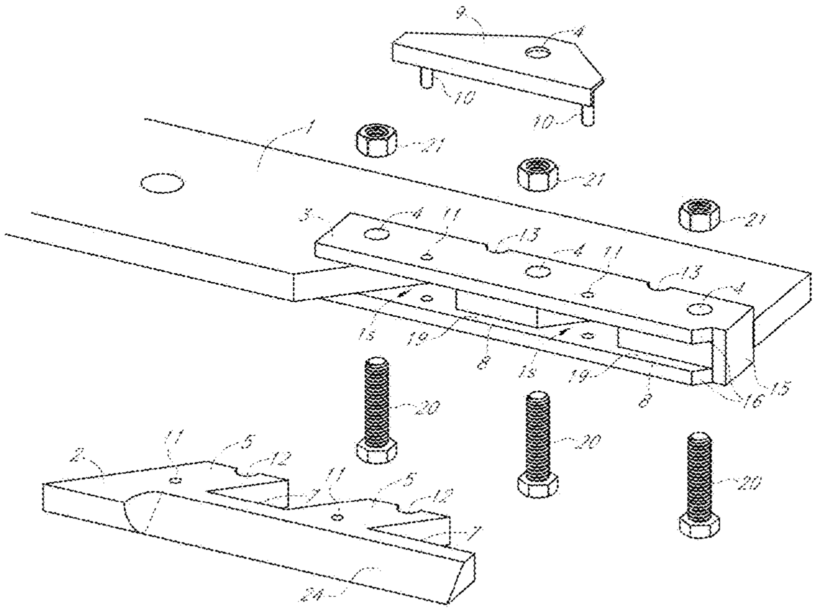
FIG. 3A shows a perspective view of a portion of a rotatable blade including a replaceable cutting edge and associated retainer bracket and replaceable cutting edge retainer bracket according to one embodiment of the present disclosure.

FIG. 2 shows an embodiment of one end of a rotatable blade 1 that rotates in a clockwise direction with the replaceable cutting edge 2, the retainer bracket 3, attachment bolts 20, and the attachment nuts 21 separated for illustration on the outside leading edge of the rotatable blade 1. The mounting holes 4 in both the rotatable blade 1 and the retainer bracket 3 are for the attachment of the retainer bracket 3 to the rotatable blade 1 by the bolts 20 and the nuts 21 as shown in FIG. 1. The holes 11 in the retainer bracket 3 and the replaceable cutting edges 2 accommodate the retainer pins 10 on the replaceable cutting edge retainer bracket spring 9 shown in FIG. 3A and FIG. 3B. The retainer pins 10 on the replaceable cutting edge retainer bracket provide retention of the replaceable cutting edges 2 to the retainer bracket 3 when assembles as shown in FIG. 3A. The retainer bracket notch 14 in the rotatable blade 1 is to accommodate the placement of the retainer bracket end section 15. The angled cutout 16 allows for a replaceable cutting edge 2 to rest against the retainer bracket end section 15 when all pieces are assembled as shown in FIG. 1. This allows for the retainer bracket end section 15 to act as a spacer to provide support for the replaceable cutting edges 2 to rest against and contacts the rotatable blade 1 so all together they are touching each other as contiguous pieces. When all pieces are assembled as shown in FIG. 1 the perpendicular to travel mating surfaces 7 on the replaceable cutting edge 2 rest squarely against the perpendicular to travel mating surfaces 8 on the rotatable blade 1. This mating joint surface provides strength and allows the replaceable cutting edge 2 to butt up to the rotating blade 2 forming contiguous pieces allowing for the transfer of the forces acting on the replaceable cutting edge 2 from the direction of rotation between the replaceable cutting edge 2 and the rotatable blade 1. When the pieces are all assembled together as shown in FIG. 1 the assembled body is bonded together with strength comparable to a single piece rotating blade without replaceable cutting edges. When the replaceable cutting edges 2 are slid together with the rotatable blade 1 they become contiguous pieces with tight tolerances between the mating surfaces where debris and corrosion can form between the joints of the adjoining pieces that can make separation difficult. Cutouts 12 on the angled fingers of the replaceable cutting edges 2 and cutouts 13 on the retainer bracket 3 are in alignment vertically and horizontally with each other when the retainer bracket 3 and the replaceable cutting edge 2 are assembled together as shown in FIG. 1. Cutouts 13 in the retainer bracket 3 and cutouts 12 in the replaceable cutting edge 2 provide access so a prying tool or wedge can be used to aid in separation of the replaceable cutting edge 2 from the rotatable blade 1 during servicing. Cutouts 13 in the retainer bracket 3 and the cutouts 12 in the replaceable cutting edge also provide an outlet relief for any debris that could be in the socket area formed when the retainer bracket 3 is installed on the rotatable blade 1 as shown in FIG. 3A.

FIG. 3A shows an assembly drawing of one end of a rotatable blade 1 that rotates in a clockwise direction with the retainer bracket 3 is positioned on the rotatable blade 1, The retainer bracket 3 wraps around the leading edge of the outside tip of the rotatable blade 1 with the retainer bracket end section 15 located in the retainer bracket notch 14 (shown in FIG. 2) where the retainer bracket end section 15 recesses inwardly into the body of the rotatable blade 1 so the retainer bracket end section 15 does not extend beyond the outside edge of the rotatable blade 1. The combination of the retainer bracket 3 and the blade 1 form one or more sockets 1*s* into which the one or more fingers 5 of the cutting edge 2 may be inserted. The angled cut edges 16 in the retainer bracket 3 allows the back side of the outer tip of the tapered cutting edge 24 to rest on the retainer bracket end section 15 with the outer tip of the replaceable cutting edge 2 flush with the outside edge of the rotatable blade 1 and not extend past the outside edge of the rotatable blade 1 as shown in FIG. 1. Mounting holes 4 in both the retainer bracket 3 and rotatable blade 1 allow for the retainer bracket to be fastened to the rotatable blade 1 by using attachment bolts 20 and nuts 21. Retainer bracket 3 can also secured to the rotatable blade 1 by many other methods used in manufacturing other than using the bolts 20 or nuts 21 shown in these drawings. For example, the retainer bracket 3 could also be attached to the rotatable blade 1 by rivets, different types of bolts, different types of nuts, welding the retaining bracket 3 to the rotatable blade 1, or by casting a rotatable blade with a socket that could duplicate the concept of said invention. Due to the corrosive operating environment rotating cutting blades encounter consideration should be given to either coating the retainer bracket 3 with anti-corrosive material or making the retainer bracket 3 out of anti-corrosive material like stainless steel. When the retainer bracket 3 is installed on the rotatable blade 1 as illustrated in FIG. 3A the retainer bracket 3 bridges across the outwardly angled slots (6 in FIG. 1A) in the rotatable blade 1 and creates a socket that accommodates the angled fingers (5 in FIG. 1A) when the replaceable cutting edge is slid together as shown in FIG. 1. This socket area also has an overlap area 19 that overlaps the longitude area of the replaceable cutting edge 2 in the area horizontal to the back side of the tapered cutting edge 24. The bridging of the retainer bracket 3 across the slots (6 in FIG. 1A) sandwiches the replaceable cutting edge 2 between the upper and lower retainer bracket 3 as shown in FIG. 1. The socket area shown in FIG. 3A also allows for the replaceable cutting edges 2 to be made in a manner where they are easy to manufacture without special tooling or a special manufacturing process. In some embodiments, the replaceable cutting edges 2 are made from the same material as the rotatable blade 1. In other embodiments, the material composition of the replaceable cutting edges 2 differs from the material composition of the rotatable blade 1 in order to have the replaceable cutting edges 2 made of a material that improves wear and durability. When assembled together as shown in FIG. 1 the mating surface of the replaceable cutting edge 7 rest squarely against the mating surface of the rotating blade 8 forming a contiguous piece between the rotatable blade 1 and the replaceable cutting edge 2. When assembled together as shown in FIG. 1 this socket configuration, overlap area 19, mating of the cutting edge surfaces 7, and mating of rotating blade surfaces 8 form a strong retainer that bonds the rotatable blade 1, retainer bracket 3, and the replaceable cutting edges 2 securely in place and provides the strength and support where the replaceable cutting edge 2 is retained in a sandwich position duplicating as close as possible a the strength and support of a single piece rotating blade that does not have replaceable cutting edges. To help secure the replaceable cutting edge in place, to ensure safety, and to prevent the replaceable cutting edge from an unintended separation from the retaining socket the replaceable cutting edge retainer bracket spring 9 is installed directly on top of the retainer bracket 3 and is secured in place by the center bolt 20 and nut 22 in the retainer bracket 3 as shown in FIG. 1. The replaceable edge retainer bracket spring 9 has two retaining pins 10 that protrude through the pin holes 11 in the retainer bracket 3 and thru the pin holes 11 in the replaceable cutting edge 2 to hold the replaceable cutting edge 2 securely in place during operation. Cutouts 13 in the retainer bracket 3 and cutouts 12 in the replaceable cutting edge 2 provide access so a prying tool or wedge can be used to aid in separation of the replaceable cutting edge 2 from the rotatable blade 1. Cutouts 12 on the angled fingers of the replaceable cutting edges 2 and cutouts 13 on the retainer bracket 3 are in alignment vertically and horizontally with each other when the retainer bracket 3 and the replaceable cutting edge 2 are assembled together as shown in FIG. 1. Cutouts 13 in the retainer bracket 3 and cutouts 12 in the replaceable cutting edge 2 provide access so a prying tool or wedge can be used to aid in separation of the replaceable cutting edge 2 from the rotatable blade 1 during servicing. Cutouts 13 in the retainer bracket 3 and the cutouts 12 in the replaceable cutting edge 2 also provide an outlet relief for any debris that could be in the socket area formed when the retainer bracket 3 is installed on the rotatable blade 1 as shown in FIG. 3A.

Figure 3B:
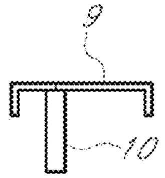
FIG. 3B shows a plan side view of a replaceable cutting edge retainer bracket according to one embodiment of the present disclosure.
Figure 4A:
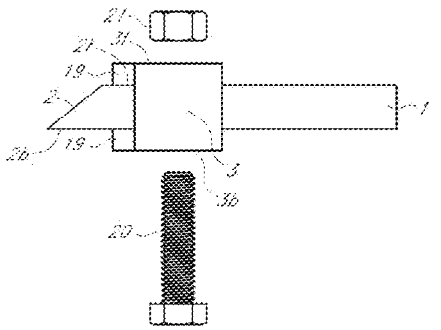
FIG. 4A shows a plan side view of a rotatable blade including a replaceable cutting edge and associated replaceable cutting edge retainer bracket according to one embodiment of the present disclosure.

FIG. 3B shows an end view of the replaceable cutting edge retainer bracket spring 9 and the retaining pins 10 that are part of the bracket FIG. 4A shows the end view of the assembled flat clockwise rotatable blade shown in FIG. 1. The retainer bracket 3 is assembled over the rotatable blade 1 with the replaceable cutting edge 2 slid against the rotatable blade 1 and sandwiched between the upper and lower portion of the retainer bracket 3 with the retainer bracket overlap 19 extending past the back edge of the replaceable cutting edge.

Figure 4B:
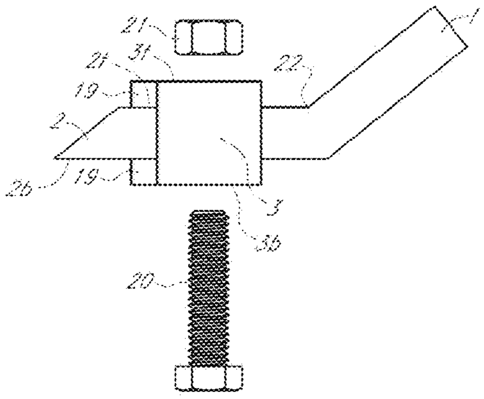
FIG. 4B shows a plan side view of a rotatable blade including an aerodynamic wing portion and a replaceable cutting edge and associated replaceable cutting edge retainer bracket according to one embodiment of the present disclosure.
Figure 5:
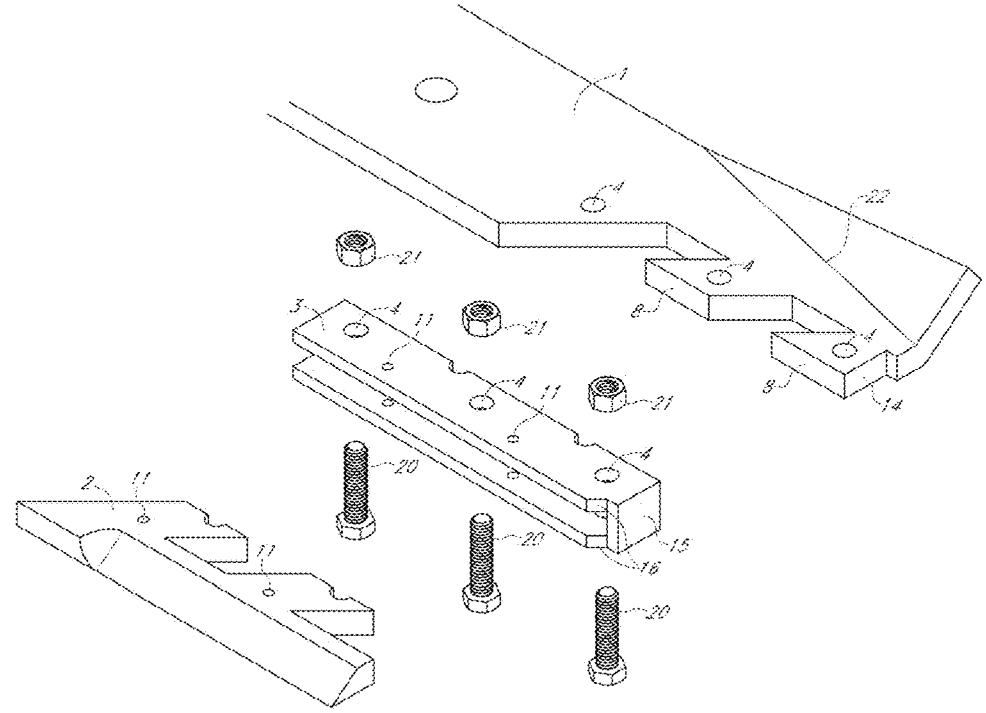
FIG. 5 shows an exploded perspective view of a portion of a rotatable blade including an aerodynamic wing portion and an associated replaceable cutting edge and retainer bracket according to one embodiment of the present disclosure.

FIG. 4B shows the end view of an assembled rotatable blade 1 shown in FIG. 5 with a bend line 22 put on the rotatable blade 1 forming a wing tip on the rotatable blade 1 to promote aerodynamic action in addition to cutting from the rotatable blade 1. The retainer bracket 3 is assembled over the rotatable blade 1 with the replaceable cutting edge 2 slid against the rotatable blade 1 and sandwiched between the upper and lower portion of the retainer bracket 3 with the retainer bracket overlap 19 extending past the back edge of the replaceable cutting edge 2. There is an abundant number of rotating cutting blades in the marketplace that are bent with wing tips formed and shaped to provide aerodynamic action in addition to cutting action. This view shows the flexibility of the said invention used on rotatable blades 1 that are bent, twisted, or shaped to provide aerodynamic functions in addition to cutting. Inventions of prior art replaceable cutting tip designs cannot be feasibly used with many blade configurations that have the rotating blade bent to form an aerodynamic wing.

Figure 4C:
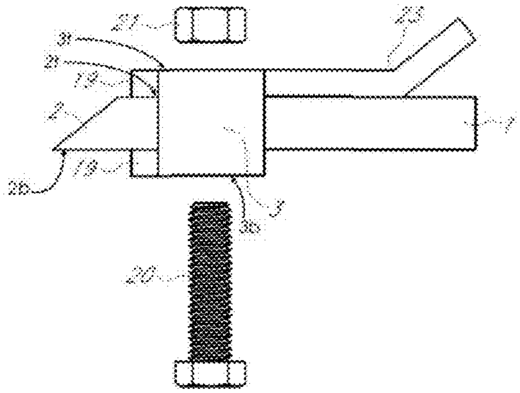
FIG. 4C shows a plan side view of a rotatable blade including a replaceable cutting edge and an associated retainer bracket including an aerodynamic wing portion according to one embodiment of the present disclosure.
Figure 6:
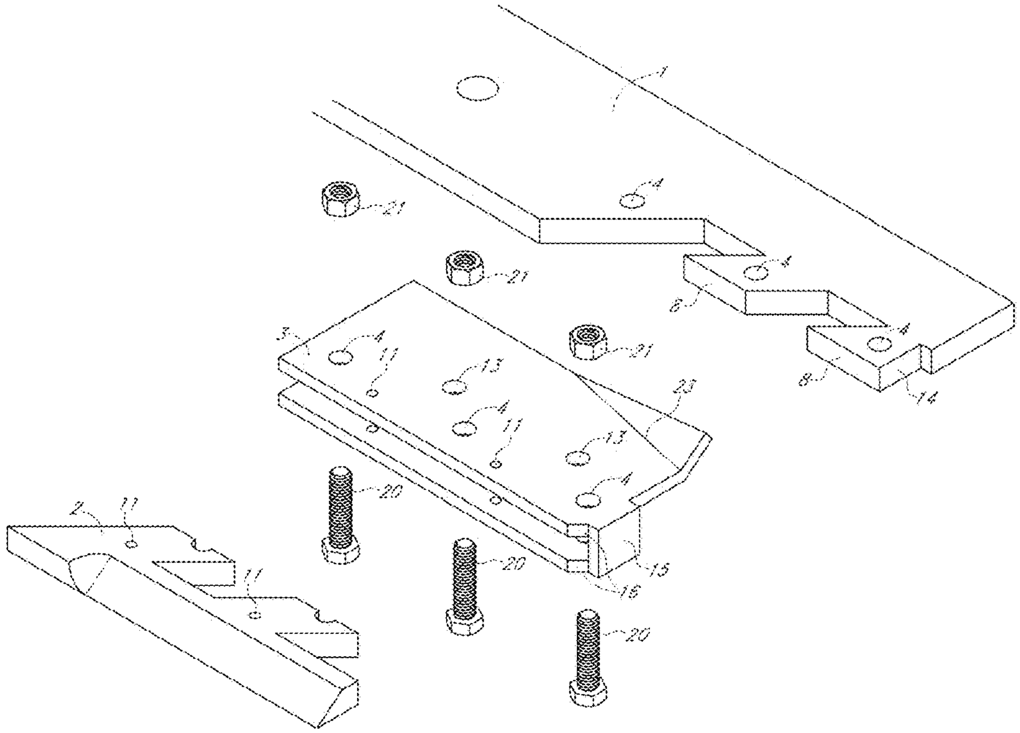
FIG. 6 shows an exploded perspective view of a portion of a rotatable blade, an associated replaceable cutting edge, and an associated retainer bracket including an aerodynamic wing according to one embodiment of the present disclosure.

FIG. 4C shows the end view of a flat clockwise rotating blade shown in FIG. 6 with a bend line 23 put on the retainer bracket 3 to promote aerodynamic action in addition to cutting action from the rotatable blade 1 using the retainer bracket 3 to provide the function rather than a bend on the rotatable blade 1 like is shown in FIG. 4B. The retainer bracket 3 is assembled over the rotatable blade 1 with the replaceable cutting edge 2 slid against the rotatable blade 1 and sandwiched between the upper and lower portion of the retainer bracket 3 with the retainer bracket overlap 19 extending past the back edge of the replaceable cutting edge. This view also shows the flexibility of the said invention by having an option to produce a retainer bracket 3 with a slight variation where the retainer bracket 3 is bent across a bend line 23 and used as an alternative design to a rotating blade that is bent like the blade that is shown in FIG. 4B to provide aerodynamic functions in addition to cutting. This embodiment may be able to be produced at a substantially lower cost compared to a rotatable cutting blade that is bent to provide the same purpose.

FIG. 5 shows an alternative assembly drawing of one end of a clockwise rotatable blade 1 that has a bend line 22 across the outer tip of the rotatable blade 1 to provide aerodynamic functions by the rotatable blade 1 in addition to cutting. With the exception of the bend line 22 all other illustrations and features in FIG. 5 are identical in scope and purpose to the rotatable blade 1, replaceable cutting edge 2, bolts 20, nuts 21, and retainer bracket 3 described in the detailed description of FIG. 2. FIG. 4B shows an end view of this assembled combination. This illustration further shows the adaptability to said invention to many different rotating blade designs.

FIG. 6 shows an alternative assembly drawing of one end of a clockwise rotatable blade 1 where the top section of retainer bracket 3 is different from the other illustrations in that it is made larger allowing for a portion of the upper section of the retainer bracket 3 to be bent along a bend line 23 to provide aerodynamic function in addition to cutting. The end view of this assembled blade is shown in FIG. 4C. The extra area of material used to make a larger upper portion of the retainer bracket 3 that make the upper section of the retainer bracket wider and the modification to the shape and size to the notches 13 to compensate for the addition of extra area of material on the top section of the retainer bracket 3 are the only differences in the retainer bracket 3 shown in this drawing and in FIG. 4C when compared to the other retainer brackets 3 shown in all other embodiment drawings. The extra material to make the top section of the retainer bracket 3 bigger is needed to overlay the outer tip of the rotatable blade 1 opposite the replaceable cutting edge 2 as shown in FIG. 4C and to have enough area where the retainer bracket 3 can be bent upward along the bend line 23 to form a wing tip with the purpose to provide aerodynamic function along with the cutting action for the assembled rotating blade embodiment. The shape and size of the notches 13 are enlarged on this style of retainer bracket 3 to allow the access of a tool or wedge to pry the replaceable cutting edge loose during the removal process and provide an relief outlet for any debris that could collect in the sockets formed by the retainer bracket 3 when installed on the rotatable blade 1 assemble as shown in FIG. 1. This is an optional way to manufacture the retainer bracket 3 and use the said invention replaceable cutting edge 2 with some versatility to incorporate some features that would normally be used on the rotating blade 3 as shown in FIG. 5. The versatility of usage with many different rotating designs is a distinct advantage of said invention over prior art.

Figure 7A:
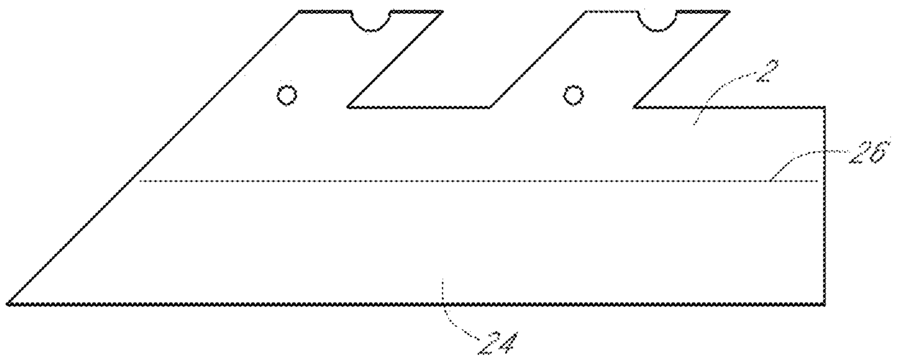
FIG. 7A shows a plan top view of a replaceable cutting edge including a bend line according to one embodiment of the present disclosure.
Figure 7B:
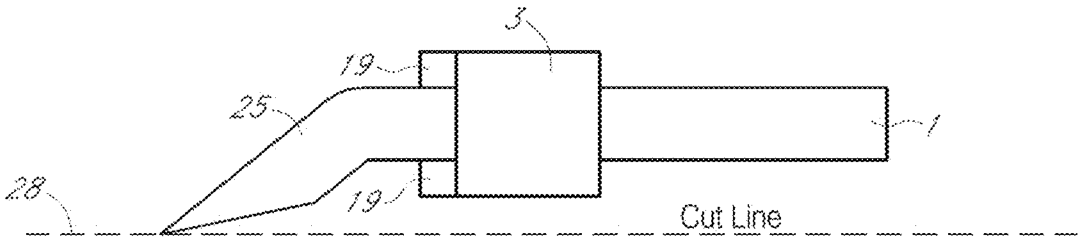
FIG. 7B shows a plan side view of the rotatable blade and associated replaceable cutting edge and retainer bracket of FIG. 7A.

FIG. 7A shows a top view of the replaceable cutting edge 2 that is downward bent as shown in FIG. 7B and shows the location of the replaceable cutting edge bend line 26 that is used to make the bend horizontally behind the tapered cutting edge 24 to make the replaceable cutting edge 2 cut below the bottom of the retainer bracket 3 as shown in FIG. 7B. This illustration is to assist in explaining the design and purpose of the alternative design of the downward bent cutting edge 25 shown in FIG. 7B.

FIG. 7B shows a side view of an alternate way to manufacture the replaceable cutting edge that would rotate in a clockwise direction with a downward bent replaceable cutting edge 25 instead of using a flat replaceable cutting edge 2 as shown FIG. 4A. The downward bent replaceable cutting edge 25 lowers the cut line 28 to where the material being cut by the rotatable blade 1 would be below the lower edge of the retainer bracket 3. The downward bent replaceable cutting edge 25 fits into the socket created by the retainer bracket 3, has the same retainer bracket overlap 19, and butts up to the rotatable blade 1 the same as a flat replaceable cutting edge does as shown in FIG. 4A. This may be an alternate design to a flat replaceable cutting edge as shown in FIG. 4A and favorable to use in operating conditions where the bottom portion of the retainer bracket would be above the cut line 28 of the material being cut. In this embodiment, the replaceable cutting edge 2 includes a tapered cutting edge 24 that extends downwardly so the cut line 28 of the material being cut is below the bottom of the retainer bracket 3.

Figure 8:
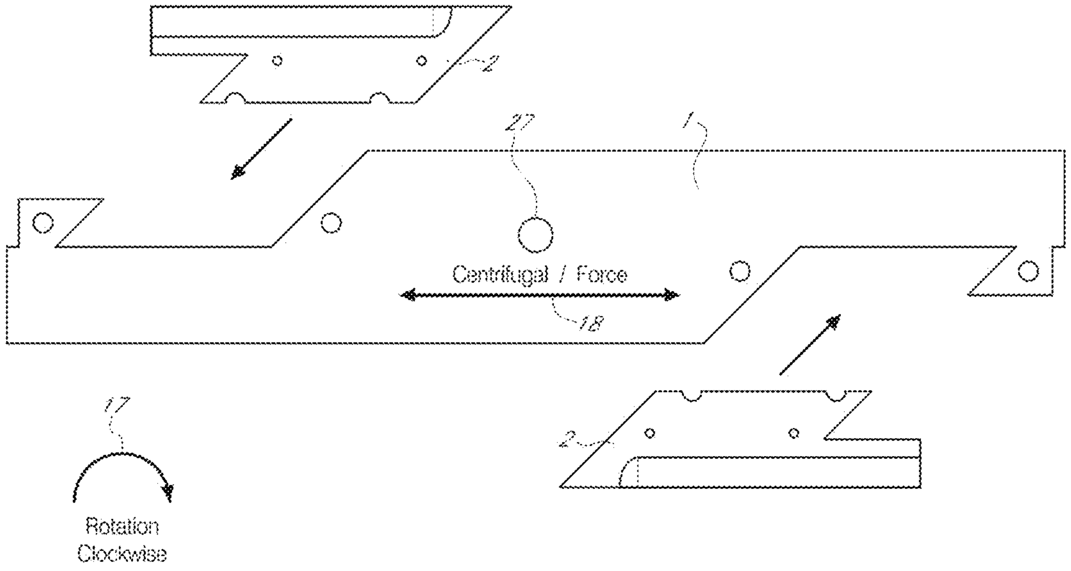
FIG. 8 shows a plan top view of a rotatable blade including two generally opposed replaceable cutting edges according to one embodiment of the present invention.

FIG. 8 show a top view of an alternate design of a rotatable blade 1 that rotates in a clockwise direction 17 and has a different design of replaceable cutting edges 2. This design was considered and could be used as an alternative to the design of said invention as shown in FIG. 1A. The design shown in FIG. 1A has the advantage of being stronger due to the additional support provided by the middle mounting hole for the retainer bracket and has better retention due to centrifugal force due to the angled slot and finger pattern shown in FIG. 1A.

In some embodiments, the retainer bracket 3 of a rotatable blade 1 with replaceable cutting edges 2 otherwise consistent with FIGS. 1-8 is recessed such that its top surface 3*t* is at or below the level of the top surface 2*t* of the replaceable cutting edge 2, and such that its bottom edge 3*b* is at or above the bottom surface 2*b* of the replaceable cutting edge 2.

Figure 9:
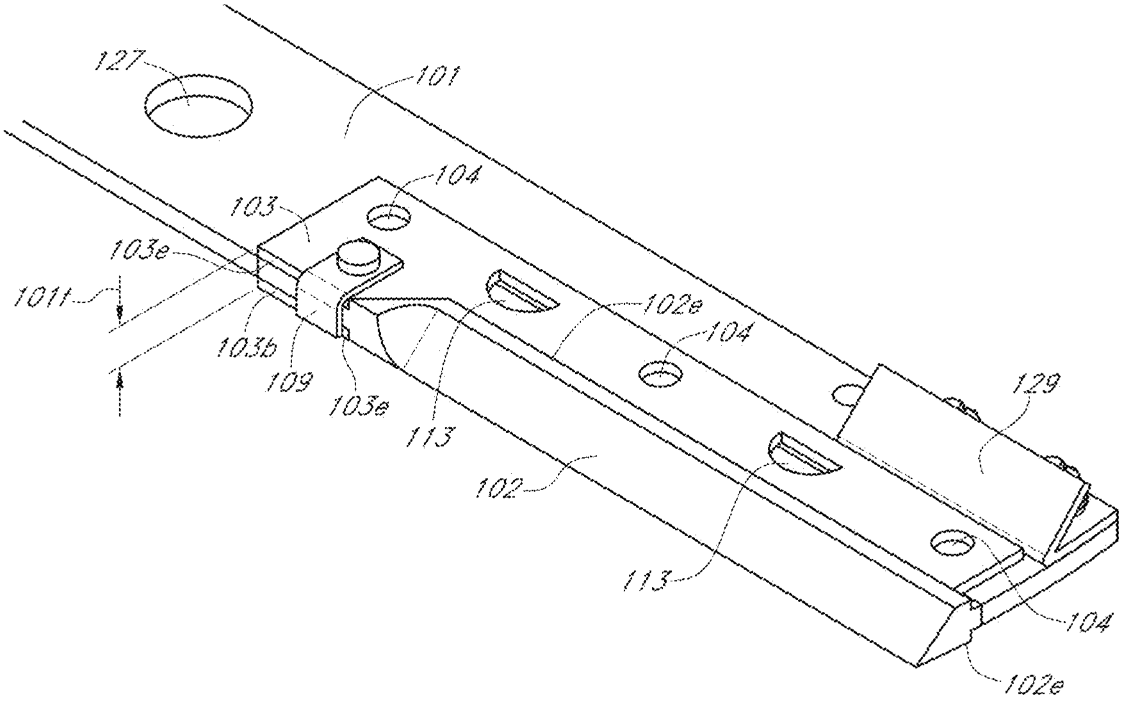
FIG. 9 shows a perspective view of a portion of a rotatable blade including a replaceable aerodynamic wing and replaceable cutting edge wherein the leading edge has an area equal to or larger than the assembled thickness of the rotatable blade assembly according to one embodiment of the present disclosure.

Referring now to FIGS. 9-100, an embodiment of the present disclosure comprises a rotatable blade body 101 including a mounting hole/axis of rotation 127, and a replaceable cutting edge 102 removably secured to the rotatable blade body 101 by a retainer bracket 103 and a retaining pin 109, and a replaceable aerodynamic wing 129 near one end of the rotatable blade body 101. In such embodiments, at least a portion of the leading edge 103*e* of the retainer bracket 103, such as a substantial portion of the leading edge 103*e*, may be at the same level as, or below, the front edge 102*e* of the replaceable cutting edge 102. Although not depicted explicitly, a second replaceable cutting edge 102 may be held in place on the opposite end and on the opposite long edge of the rotatable blade body 101 from the replaceable cutting edge 102 shown in FIG. 9 by a second retainer bracket 103 and a second retaining pin 110. A second replaceable aerodynamic wing 129 may also be disposed on the opposite end of the rotatable blade body 101 from the second replaceable aerodynamic wing 129 shown in FIG. 9. Alternatively, a rotatable blade body 101 consistent with the present disclosure may have a single replaceable cutting edge 102 removably secured to the rotatable blade body 101 by a retainer bracket 103 and a retaining pin 110, and a replaceable aerodynamic wing 129 near one end of the rotatable blade body 101.

Figure 10:
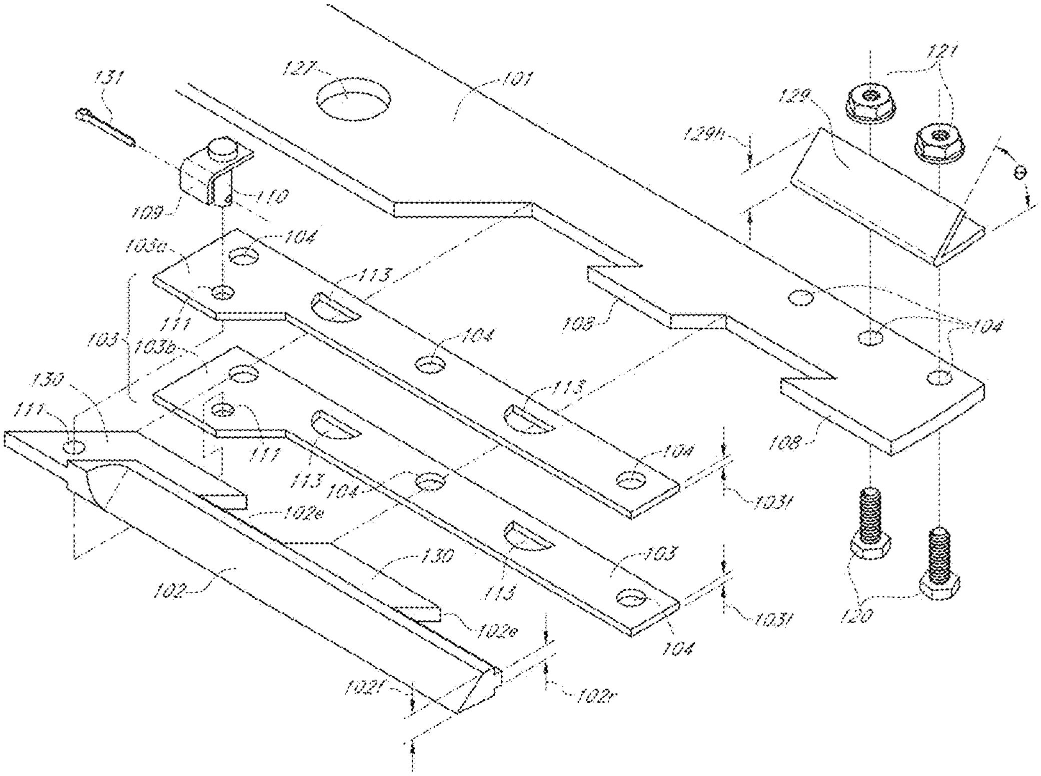
FIG. 10 shows an exploded perspective view of the embodiment shown in FIG. 9.
Figure 10A:
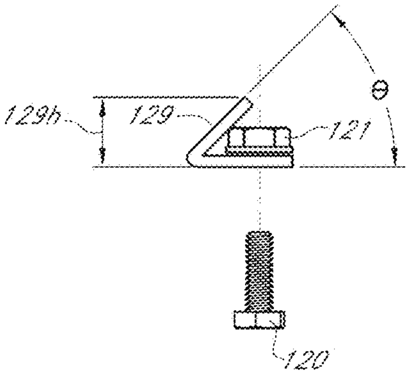
FIG. 10A shows a plan side view of one end of a replaceable aerodynamic wing and its attaching hardware according to one embodiment of the present disclosure.
Figure 10B:
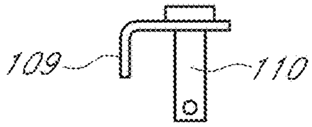
FIG. 10B shows a plan side view of a replaceable cutting edge retaining pin according to one embodiment of the present disclosure.

As shown in FIG. 10, rotatable blade body 101 includes at least one mating surface 108 with a contour that is complementary to mating surface 102*e*' of the replaceable cutting edge 102. In some embodiments, the contour of the mating surface 108 includes one or more slots that are not perpendicular to the long edge of the rotatable blade body 101. For example, as shown in FIG. 10, the contour of the mating surface 108 includes two slots that are angled away from the mounting hole/axis of rotation 127. Such a configuration provides stability to the assembled rotatable blade body 101 and replaceable cutting edge 102 to the forces imparted by high speed rotation.

A retainer bracket 103 removably secures the replaceable cutting edge 102 to the rotatable blade body 101. In some embodiments, such as the embodiment shown in FIG. 10, the retainer bracket 103 may include a top retaining bracket portion 103*a* and a bottom retaining bracket portion 103*b*. Each of the top retaining bracket portion 103*a* and the bottom retaining bracket portion 103*b* may include one or more mounting holes 104 to accommodate one or more bolts or pins (not shown) for fastening the top retaining bracket portion 103*a* and the bottom retaining bracket portion 103*b*. In some embodiments, the one or more mounting holes 104 accommodate a rivet, a plug weld, or similar feature that attaches the top retaining bracket portion 103*a* and/or the bottom retaining bracket portion 103*b* to the rotatable blade body 101. In some embodiments, securing the top retaining bracket portion 103*a* and the bottom retaining bracket portion 103*b* using low-profile or no-profile fasteners (e.g., rivets or plug welds) instead of bolts and nuts is advantageous to improve the quality of cut and blade performance (e.g., "tearing," "streaking," etc.) in use, possibly due to decreased turbulence around the rotatable blade body 101 during operation.

Each of the top retaining bracket portion 103*a* and the bottom retaining bracket portion 103*b* may include one or more cutout holes 113 to ease release of the top retaining bracket portion 103*a* and/or the bottom retaining bracket portion 103*b* from the top retaining bracket portion 103*a* and/or the bottom retaining bracket portion 103*b*, for example after a period of use. Similarly, the one or more cutout holes 113 may ease release of the replaceable cutting edge 102 from the rotatable blade body 101, for example after a period of use. For example and without limitation, the one or more cutout holes 113 may be sized to accommodate a pry tool, such as a ¼×4 flathead screwdriver tip, which may be used to pry the top retaining bracket portion 103*a* or the bottom retaining bracket portion 103*b* from the rotatable blade body 101, and/or to pry the rear edge 102*e*' of the replaceable cutting edge 102 from the mating surface 108 of the rotatable blade body 101.

Figure 10C:
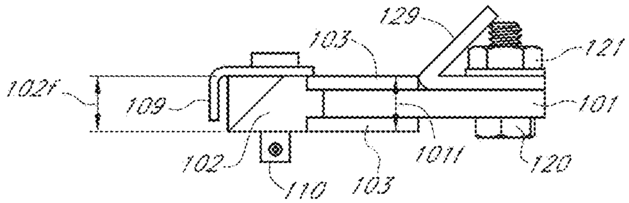
FIG. 10C shows a plan side view of a rotatable blade assembly including a replaceable aerodynamic wing and associated retainer brackets wherein the leading edge has an area equal to or larger than the assembled thickness of the rotatable blade assembly according to one embodiment of the present disclosure.

The replaceable cutting edge 102 includes a pin hole 111 that aligns with pin holes 111 in the top retaining bracket portion 103*a* and the bottom retaining bracket portion 103*b*. A retaining pin 109 includes a post 110 that mates with the aligned pin holes 111 to removably secure the replaceable cutting edge 102, the top retaining bracket portion 103*a* and the bottom retaining bracket portion 103*b* to the rotatable blade body 101. For example, as shown in FIGS. 9-10C, the retaining pin 109 also protects a portion of the leading edges 103*e* of the top retaining bracket portion 103*a* and the bottom retaining bracket portion 103*b*. A cotter pin 131 or similar removable locking mechanism secures the retaining pin 109 in place.

In some embodiments, a replaceable aerodynamic wing 129 is removably mounted to the rotatable blade body 101. The replaceable aerodynamic wing 129 may feature any suitable shape. In the embodiment shown in FIGS. 9-10C, for example, the replaceable aerodynamic wing 129 has a V-shaped cross section. In other embodiments, the replaceable aerodynamic wing 129 has One or more sets of bolts 120 and nuts 121 may be used to secure the replaceable aerodynamic wing 129 to the rotatable blade body 101 through one or more mounting holes 104. In some embodiments, the rotatable blade body 101 includes more mounting holes 104 than required to attach the replaceable aerodynamic wing 129 to the rotatable blade body 101. In such embodiments, the replaceable aerodynamic wing 129 may be attached in several alternate positions as desired by the user.

Although the replaceable aerodynamic wing 129 is shown in FIGS. 9, 10 and 10C as a V-shaped piece of material, in some embodiments the replaceable aerodynamic wing 129 may be a generally wedge-shaped hollow or solid block of material, such as a plastic like ultra-high-molecular-weight polyethylene, polytetrafluoroethylene, acrylonitrile butadiene styrene ("ABS"), a similar durable polymer, or a combination of two or more of the foregoing.

In some embodiments, the replaceable aerodynamic wing 129 has an angle θ that ranges from about 25° to about 55°, for example about 25° to about 55°, for example about 25°, about 30°, about 35°, about 40°, about 45°, about 50°, or about 55°. In some embodiments, the replaceable aerodynamic wing 129 has a height 129*h* that imparts aerodynamic properties on the rotatable blade similar to a standard lift mowing blade. In other embodiments, the replaceable aerodynamic wing 129 has a height 129*h* that imparts aerodynamic properties on the rotatable blade similar to a high-lift mowing blade. In some embodiments, the replaceable aerodynamic wing 129 has a height 129*h* that imparts aerodynamic properties on the rotatable blade similar to a mulching blade.

Surprisingly, the thickness 103*t* of the top retaining bracket portion 103*a* and the bottom retaining bracket portion 103*b* is not critical for embodiments consistent with FIGS. 9-100. Instead, it has been found that embodiments wherein the leading edge 103*e* of the top retaining bracket portion 103*a* and the bottom retaining bracket portion 103*b* is at or even below the level of the trailing edge 102*e*' of the replaceable cutting edge 102 permit the use of relatively thin gauge materials compared to the thickness 101*t* of the rotatable blade body 101. In some embodiments, the top retaining bracket portion 103*a* and the bottom retaining bracket portion 103*b* each have a thickness 103*t* of about 0.025 inches (e.g., 24-gauge) to about 0.1 inches (e.g., 12-gauge), for example about 0.025 inches, about 0.03 inches, about 0.035 inches, about 0.04 inches, about 0.045 inches, about 0.05 inches, about 0.055 inches, about 0.06 inches, about 0.065 inches, about 0.07 inches, about 0.075 inches, about 0.08 inches, about 0.085 inches, about 0.09 inches, about 0.095 inches, or about 0.1 inches. In some embodiments, the rotatable blade body 101 has a thickness 101*t* of about 0.125 inches to about 0.375 inches, for example about 0.125 inches, about 0.15 inches, about 0.175 inches, about 0.2 inches, about 0.225 inches, about 0.25 inches, about 0.275 inches, about 0.3 inches, about 0.325 inches, about 0.35 inches, or about 0.375 inches. In some embodiments, the top retaining bracket portion 103*a* and the bottom retaining bracket portion 103*b* each have a thickness 103*t* that is not more than about 50% of the thickness 101*t* of the rotatable blade body 101, for example not more than about 50%, not more than about 45%, not more than about 40%, not more than about 35%, not more than about 30%, not more than about 25%, not more than about 20%, not more than about 15%, not more than about 10%, or not more than about 5% of the thickness 101*t* of the rotatable blade body 101.

In some embodiments, the thickness 103*t* of the top retaining bracket portion 103*a* is the same as the thickness 103*t* of the bottom retaining bracket portion 103*b*. In other embodiments, the thickness 103*t* of the top retaining bracket portion 103*a* is greater than the thickness 103*t* of the bottom retaining bracket portion. In still other embodiments, the thickness 103*t* of the top retaining bracket portion 103*a* is less than the thickness 103*t* of the bottom retaining bracket portion. In one embodiment, for example as shown in FIG. 10, the replaceable cutting edge 102 includes a recessed profile portion 130 that has a smaller thickness 102*r* than the maximum thickness 102*f* of the replaceable cutting edge 102.

As shown most readily in FIGS. 9, 10 and FIG. 100, it has been surprisingly discovered that rotatable blades consistent with the present disclosure perform significantly better (e.g., provide a better quality of cut and blade performance) when the maximum thickness 102*f* of the replaceable cutting edge 102 is greater than or equal to the combined thickness 101*t* of: the blade body 101, the top retaining bracket 103*a*, and the bottom retaining bracket 103*b*. In some embodiments, that relationship is accomplished by including a recessed profile portion 130 at the trailing end 102*e*' of the replaceable cutting edge 102 such that the top retaining bracket 103*a*, the recessed profile portion 130, and the bottom retaining bracket 103*b* form a "sandwich" that has a total combined thickness 101*t* that is not significantly greater than (e.g., is less than, equal to, or approximately equal to) the maximum thickness 102*f* of the replaceable cutting edge 102. In some embodiments, such as that shown in FIG. 10, the recessed profile portion 130 is located behind the front edge 102*e* of the replaceable cutting edge 102 and may extend around the one or both sides of the front edge 102*e* of the replaceable cutting edge 102. In other embodiments, the recessed profile portion 130 may be entirely located behind the front edge 102*e* of the replaceable cutting edge 102 (e.g., so that no portion of the recessed profile portion 130 is in line or nearly in line with the first long edge of the blade body 101). Such replaceable cutting edges 102 may be prepared by any suitable means including, for example, by removing excess material from a similar replaceable cutting edge 102 that does not include a recessed profile portion 130, by combining a relatively thick piece of material (that forms or will form the tapered cutting edge) to a relatively thin piece of material (that forms the recessed profile portion 130), or by metal casting.

In some embodiments, such as those shown in FIGS. 1, 2, 3A-6, 8-10, and 100, the replaceable cutting edge 2/102 includes a single taper from a front-most edge toward the finger(s) 5/trailing edge 103*e'*.

In other embodiments, the replaceable cutting edge 2/102 includes two tapers; each originating from a shared front-most edge and sloping way from each other toward the finger(s) 5/trailing edge 103*e'* (e.g., a double-tapered edge). In some embodiments, a replaceable cutting edge 2/102 including two tapers may be symmetric from top to bottom. A rotatable blade 1/101 including one or more of such symmetric replaceable cutting edges 2/102 may be used on either a machine that causes the blade to rotate clockwise, or a machine that causes the blade to rotate counter-clockwise without significantly affecting performance.

In operation, the performance of a used rotatable blade according to the present disclosure can be efficiently improved by removing the retaining brackets 3/103 from an assembled rotatable cutting blade consistent with the present disclosure; un-mating the replaceable cutting edges 2/102 from the blade body 1/101; and mating new or re-sharpened replaceable cutting edges 2/102 to the blade body 1/101. In some embodiments, these steps can all be performed without separating the blade body from an associated mounting apparatus, drive chain, or motor.

Referring now generally to FIGS. 11A-13C, rotatable blades consistent with another embodiment of the present disclosure include a rotatable carrier 201 and at least one replaceable cutting edge 202 that interlock to form the rotatable blade 300.

In some embodiments, a rotatable blade consistent with the present disclosure includes a single replaceable cutting edge. One or more of such rotatable blades may be attached about a circular mounting device to form a "flail" type blade assembly. In other embodiments, such as those consistent with FIGS. 11A-13C, a rotatable blade consistent with the present disclosure includes two replaceable cutting edges separated by a mounting hole/axis of rotation. In other embodiments, a rotatable blade consistent with the present disclosure includes multiple replaceable cutting edges, each cutting edge disposed on one of multiple blade body sections, with each of the multiple blade body sections sharing a single common axis of rotation. In some embodiments, a rotatable blade consistent with the present disclosure includes n replaceable cutting edges, each cutting edge disposed on one of n blade body sections, with each of the n blade body sections sharing a single common axis of rotation.

Figure 11A:
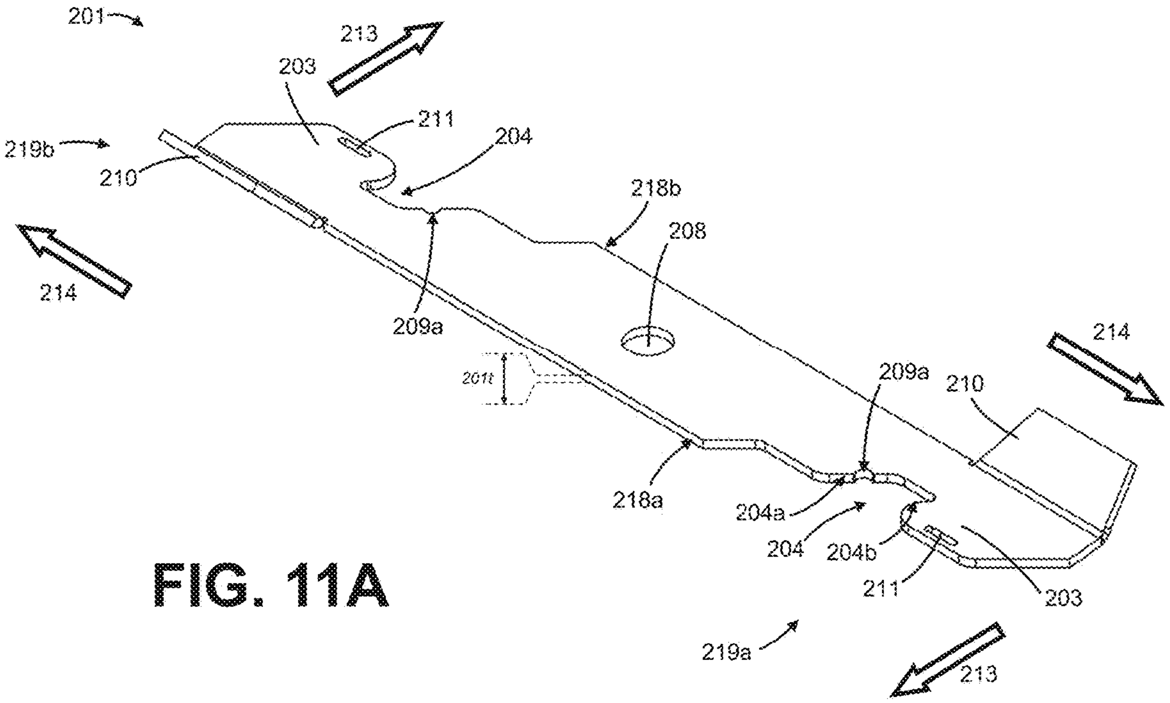
FIG. 11A shows a perspective view of a blade carrier portion of a rotatable blade consistent with one embodiment of the present disclosure.
Figure 11B:
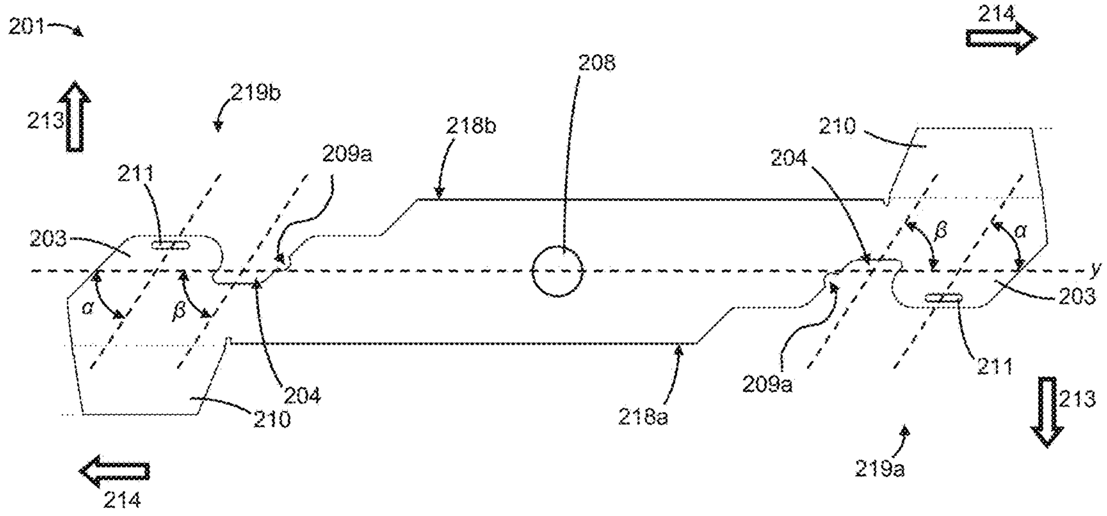
FIG. 11B shows a top plan view of the blade carrier portion of FIG. 11A.

Referring now to FIGS. 11A-11B, a rotatable carrier 201 consistent with the present disclosure includes a mounting hole 208 at or near the center of mass of the rotatable carrier 201. The rotatable carrier 201 includes a first long edge 218*a* and a second long edge 18*b* opposite the first long edge 218*a*, and a first end portion 219*a* disposed at one end, and a second end portion 219*b* disposed at the opposite end. In operation, the rotatable carrier 201 rotates about the mounting hole 208 in the direction shown by arrows 213, generating centrifugal force along arrows 214.

Each long edge 218*a*/218*b* includes at least one angled finger 203 protruding away from the opposite long edge 218*b*/218*a*. The angled finger 203 protrudes at an angle α relative to the longitudinal axis y of the rotatable carrier 201. In some embodiments, the angle α is acute. In other embodiments, the angle α is obtuse. In some embodiments, the angle α is about 10° to about 80°, for example about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, about 60°, about 61°, about 62°, about 63°, about 64°, about 65°, about 66°, about 67°, about 68°, about 69°, about 70°, about 71°, about 72°, about 73°, about 74°, about 75°, about 76°, about 77°, about 78°, about 79°, or about 80°. In other embodiments, the angle α is about 100° to about 170°, for example about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 169°, or about 170°.

Each long edge 218*a*/218*b* further includes at least one angled receiving slot 204 recessed inward towards the opposite long edge 218*b*/218*a*. The angled receiving slot 204 is recessed at an angle β relative to the longitudinal axis y of the rotatable carrier 201. In some embodiments, the angle β is acute. In other embodiments, the angle β is obtuse. Generally, the angle β should be acute when the angle α described above is acute; and the angle β should be obtuse when the angle α described above is obtuse. In some embodiments, the angle β is about 10° to about 80°, for example about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, about 60°, about 61°, about 62°, about 63°, about 64°, about 65°, about 66°, about 67°, about 68°, about 69°, about 70°, about 71°, about 72°, about 73°, about 74°, about 75°, about 76°, about 77°, about 78°, about 79°, or about 80°. In other embodiments, the angle is about 100° to about 170°, for example about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 169°, or about 170°.

The rotatable carrier 201 further includes a retaining mechanism notch 9*a* along the contoured portion of each long edge 218*a*/218*b*. The retaining mechanism notch 209*a* is configured to receive at least a portion of a retaining pin 205 (see FIG. 13A).

The rotatable carrier 201 further includes a removal slot 211 disposed adjacent each of the first end portion 219*a* and the second end portion 219*b*. The removal slot 211 is configured to receive at least a portion of a tool (e.g., a flathead screwdriver) to assist in un-mating the removable cutting edge 202 from the rotatable carrier 201.

The rotatable carrier 201 may have any suitable thickness 201*t* for the intended use of the rotatable blade 300. In some embodiments, the thickness 201*t* is about 0.1 inches to about 0.4 inches, for example about 0.1 inches, about 0.11 inches, about 0.12 inches, about 0.13 inches, about 0.14 inches, about 0.15 inches, about 0.16 inches, about 0.17 inches, about 0.18 inches, about 0.19 inches, about 0.2 inches, about 0.21 inches, about 0.22 inches, about 0.23 inches, about 0.24 inches, about 0.25 inches, about 0.26 inches, about 0.27 inches, about 0.28 inches, about 0.29 inches, about 0.3 inches, about 0.31 inches, about 0.32 inches, about 0.33 inches, about 0.34 inches, about 0.35 inches, about 0.36 inches, about 0.37 inches, about 0.38 inches, about 0.39 inches, or about 0.4 inches.

In some embodiments, the rotatable carrier 201 further includes an air/debris deflector 210 disposed near each of the first end portion 219*a* and the second end portion 219*b*.

Figure 12A:
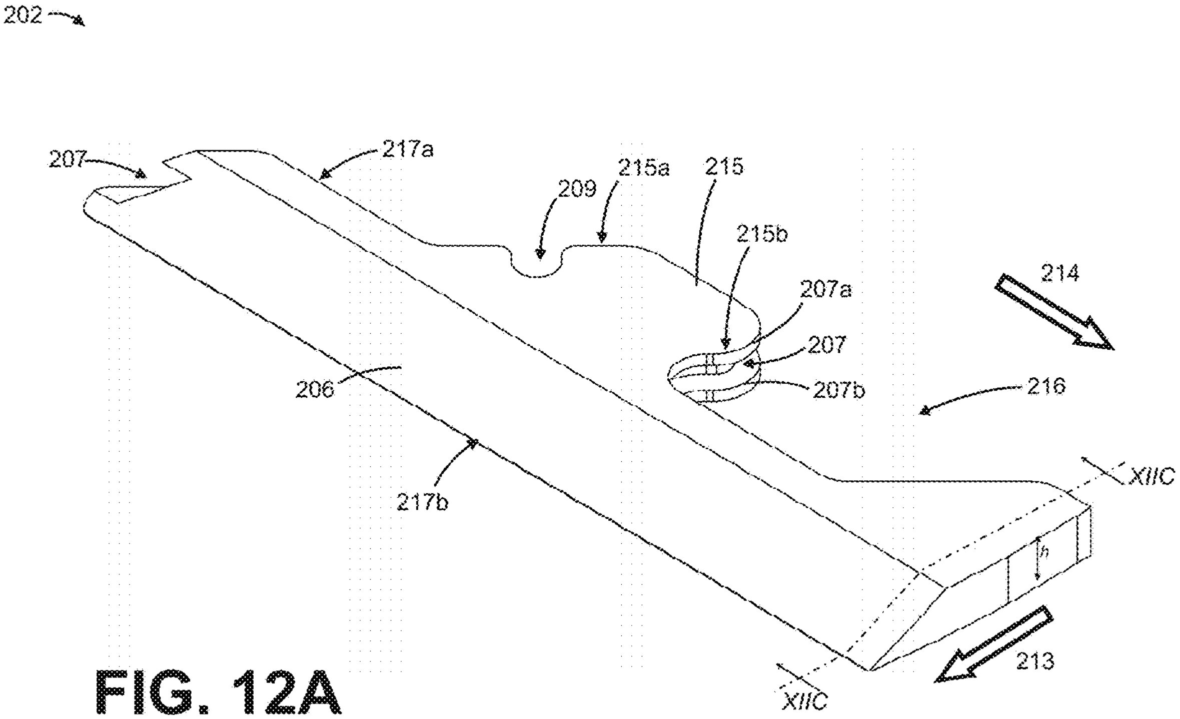
FIG. 12A shows a perspective view of a replaceable cutting edge for mating with a blade carrier portion consistent with the present disclosure.
Figure 12B:
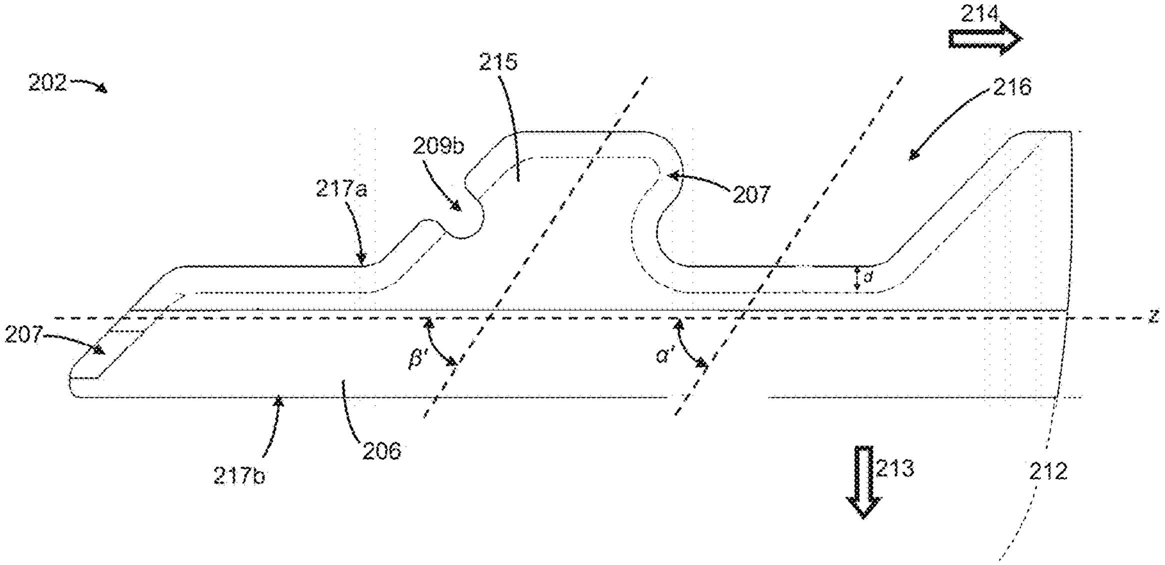
FIG. 12B shows a top plan view of the replaceable cutting edge of FIG. 12A.
Figure 12C:
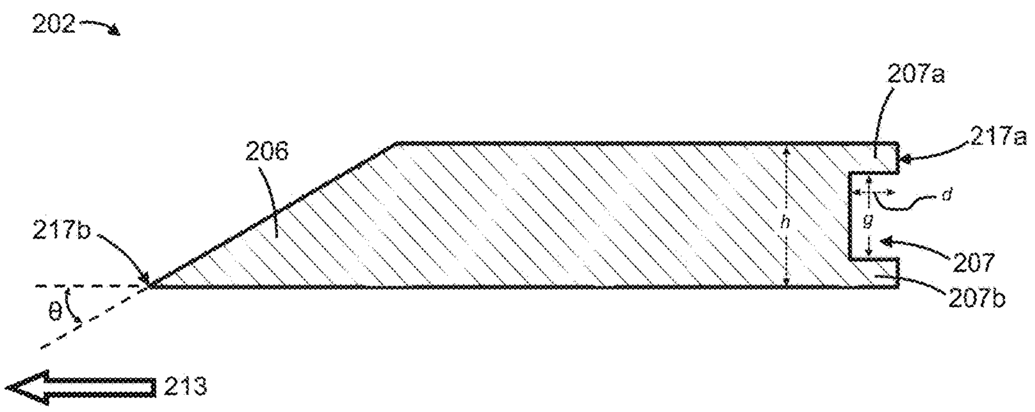
FIG. 12C shows an end view of the replaceable cutting edge of FIG. 12A.
Figure 13A:
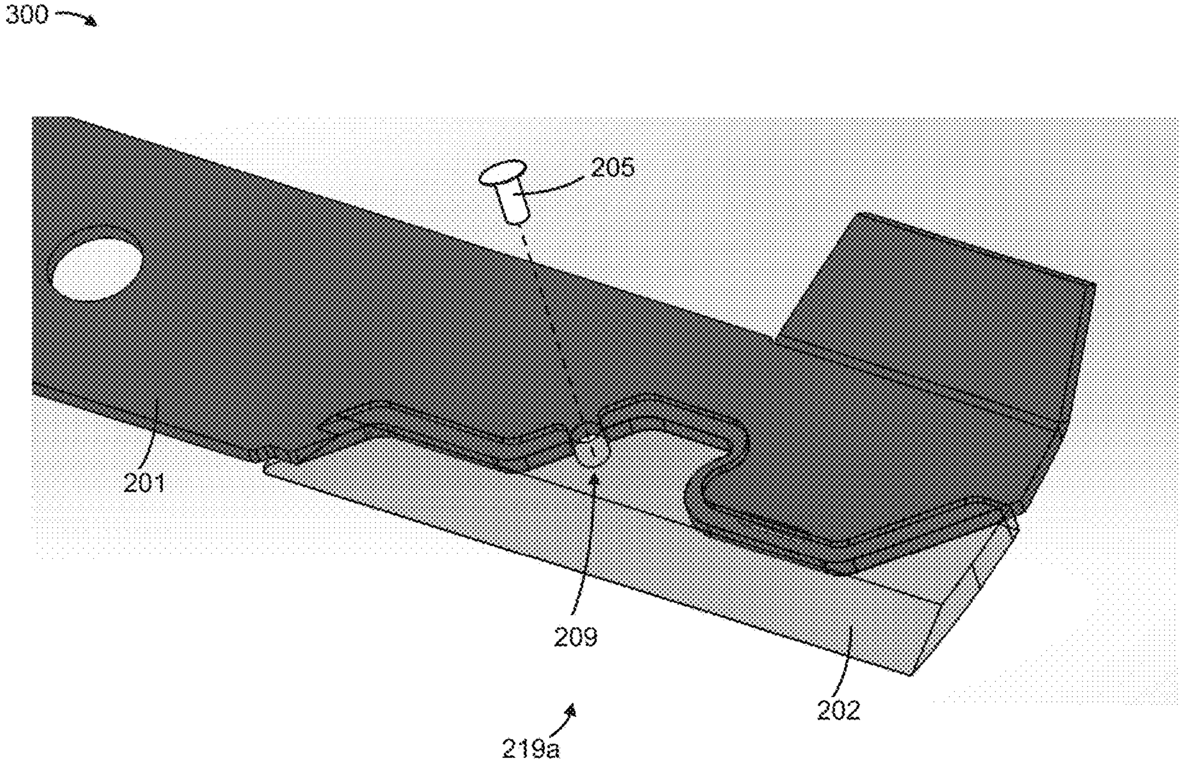
FIG. 13A shows a perspective view of one end of a rotatable blade consistent with one embodiment of the present disclosure, wherein the replaceable cutting edge portion is shown transparently for convenience.
Figure 13B:
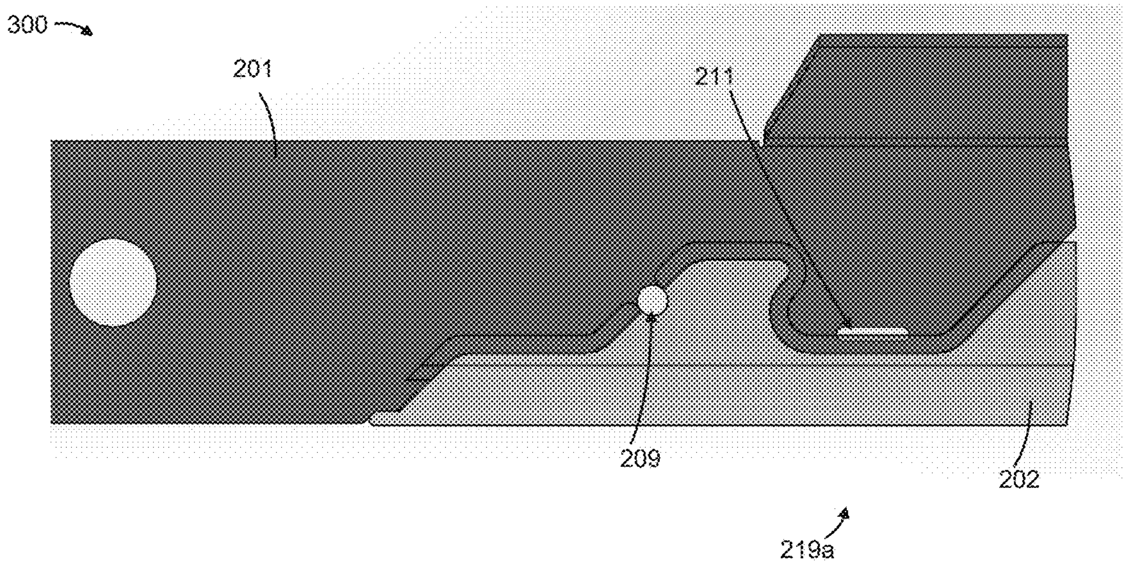
FIG. 13B shows a top plan view of the portion of the rotatable blade of FIG. 13A.
Figure 13C:
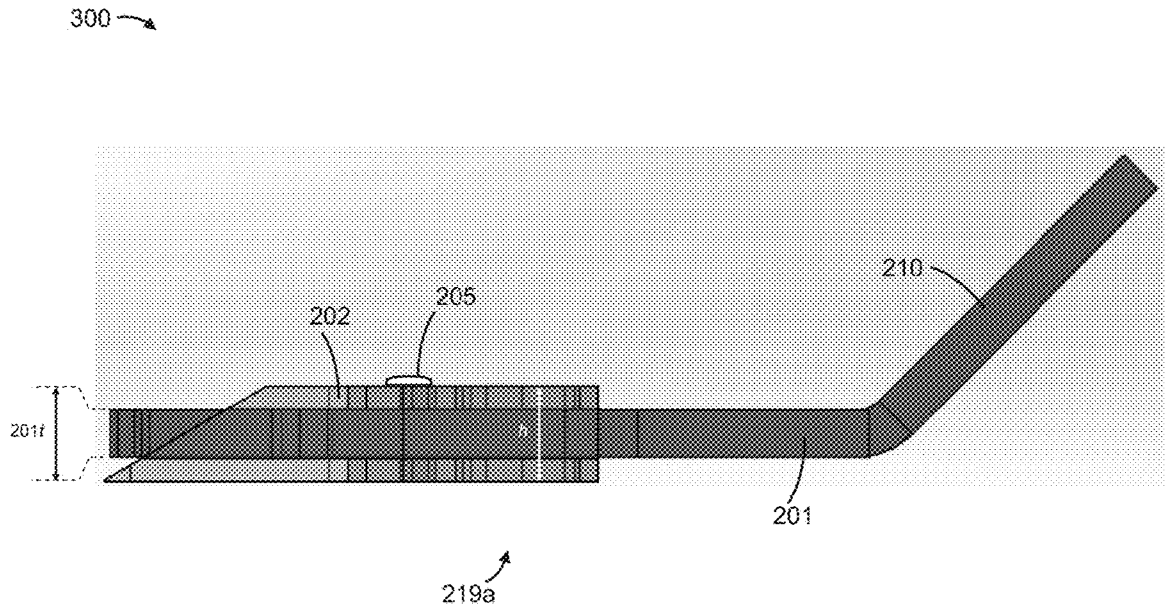
FIG. 13C shows an end view of the portion of the rotatable blade of FIG. 13A.

Referring now to FIGS. 12A-12C, the replaceable cutting edge 202 is sized and shaped to mate with the first long edge 218*a* and the second long edge 218*b*. The replaceable cutting edge 202 includes a first longitudinal edge 217*a* and a second longitudinal edge 217*b* opposite the first longitudinal edge 217*a*. The replaceable cutting edge 202 is preferably formed from a single piece of material such as steel, iron, etc. The replaceable cutting edges 202 are held in place largely (e.g., substantially or exclusively) by an opposing inwardly angled finger and slot pattern on the carrier and an outwardly angled shaped finger and slot pattern on the replaceable cutting edge that uses centrifugal force to assist with retention when mated together. The rotatable carrier 201 includes a pattern of inwardly angled finger(s) 203 and receiving slot(s) 204 complementary to a pattern of outwardly angled finger(s) 215 and outwardly angled slot(s) 216 of the replaceable cutting edge 202; for rotatable blades 300 that rotate about the mounting hole 208 in a direction 213 opposite that shown in FIGS. 11A-12C, the patterns may be reversed to provide a counter-rotatable blade 300 including one or more replaceable cutting edges 202 that are largely (e.g., substantially or exclusively) secured to the rotatable carrier 201 by centrifugal force 214.

The replaceable cutting edge 202 includes a tapered cutting edge 206 along the second longitudinal edge 217*b*. The tapered cutting edge 206 is tapered at an angle θ. The angle θ may be from about 20° to about 45°, for example about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, or about 45°. In some embodiments, the angle θ is about 30°.

In some embodiments, the replaceable cutting edge 202 further includes a receiving slot 207 for reversibly mating with the first long edge 218*a* or the second long edge 218*b* of the rotatable carrier 201. The receiving slot 207 has a height g sufficient to enable secure mating to the long edge 218*a*/218*b* of the rotatable carrier 201, but not so large that the top shoulder 207*a* and the bottom shoulder 207*b* lack structural integrity. In some embodiments, the receiving slot 207 has a height g of about 40% to about 65% of the thickness h of the replaceable cutting edge 202, for example about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65% of the thickness h of the replaceable cutting edge 202.

The receiving slot 207 has a depth d of about 0.1 to about 0.4 inches, for example about 0.1 inches, about 0.125 inches, about 0.15 inches, about 0.175 inches, about 0.2 inches, about 0.225 inches, about 0.25 inches, about 0.275 inches, about 0.3 inches, about 0.325 inches, about 0.35 inches, about 0.375 inches, or about 0.4 inches.

The replaceable cutting edge 202 further includes at least one angled finger 215 protruding away from the second longitudinal edge 217*b*. The at least one angled finger 215 is sized and shaped to complement (e.g., reversibly mate with) the size and shape of the at least one angled receiving slot 204 of the rotatable carrier 201. In particular, the contour of the first longitudinal edge 217*a* of the at least one angled finder 215 complements the contour of the first long edge 218*a* or second long edge 218*b* of the angled receiving slot 204. The top shoulder 207*a* and the bottom shoulder 207*b* each extend over the first long edge 218*a* or the second long edge 218*b*.

Although the embodiments shown in FIGS. 11A-13C illustrate the receiving slot 207 as a feature of the replaceable cutting edge 202, other embodiments may feature a reverse configuration of the same concept wherein the replaceable cutting edge 202 is the female receiver and the replaceable cutting edge 202 is the male counterpart complementing the female receiver of the rotatable carrier 201. This reverse configuration could be otherwise identical or similar to the embodiments shown in FIGS. 9-10C. An example of this is where the receiving slot 207 as incorporated into the second long edge 218*a* and 218 of the rotatable carrier 201. In such embodiments, the receiving slot 207 is configured to reversibly mate with the first longitudinal edge 217*a* of the replaceable cutting edge 202. In such embodiments, the first longitudinal edge 217*a* may feature a tongued cross-sectional profile with at least a portion of the tongue configured to reversibly mate with the receiving slot 207 of the rotatable carrier 201, for example such that the top shoulder 207*a* and/or the bottom shoulder 207*b* would be part of the rotatable carrier 201 and is substantially coplanar with the top surface and/or the bottom surface, respectively, of the replaceable cutting edge 202 to reduce aerodynamic turbulence over/under the rotatable blade 300 while in use. In other embodiments, the first longitudinal edge 217*a* may feature a full-thickness profile (e.g., no tongued or reduced-thickness cross-sectional profile compared to thickness h); in such embodiments the receiving slot 207 of the rotatable carrier 201 has a height g that is at least the thickness h of the replaceable cutting edge 202.

The angled finger 215 protrudes at an angle β' relative to the longitudinal axis z of the replaceable cutting edge 202. In some embodiments, the angle β' is acute. In other embodiments, the angle β' is obtuse. Generally, the angle β' should be approximately equal to, or equal to, the angle β of the angled receiving slot 204. In some embodiments, the angle β' is about 10° to about 80°, for example about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, about 60°, about 61°, about 62°, about 63°, about 64°, about 65°, about 66°, about 67°, about 68°, about 69°, about 70°, about 71°, about 72°, about 73°, about 74°, about 75°, about 76°, about 77°, about 78°, about 79°, or about 80°. In other embodiments, the angle β' is about 100° to about 170°, for example about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 169°, or about 170°.

The replaceable cutting edge 202 further includes at least one angled receiving slot 216 configured to reversibly mate with the at least one angled finger 205 of the rotatable carrier 201. In particular, the contour of the first longitudinal edge 217*a* of the at least one angled receiving slot 216 complements the contour of the first long edge 218*a* or second long edge 218*b* of the angled finger 203. The top shoulder 207*a* and the bottom shoulder 207*b* each extend over the first long edge 218*a* or the second long edge 218*b*. The at least one angled receiving slot 216 is oriented at an angle α' relative to the longitudinal axis z of the replaceable cutting edge 202. In some embodiments, the angle α' is acute. In other embodiments, the angle α' is obtuse.

Generally, the angle α' should be approximately equal to, or equal to, the angle α of the angled finger 203. In some embodiments, the angle α' is about 10° to about 80°, for example about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, about 60°, about 61°, about 62°, about 63°, about 64°, about 65°, about 66°, about 67°, about 68°, about 69°, about 70°, about 71°, about 72°, about 73°, about 74°, about 75°, about 76°, about 77°, about 78°, about 79°, or about 80°. In other embodiments, the angle α' is about 100° to about 170°, for example about 110°, about 111°, about 112°, about 113°, about 114°, about 115°, about 116°, about 117°, about 118°, about 119°, about 120°, about 121°, about 122°, about 123°, about 124°, about 125°, about 126°, about 127°, about 128°, about 129°, about 130°, about 131°, about 132°, about 133°, about 134°, about 135°, about 136°, about 137°, about 138°, about 139°, about 140°, about 141°, about 142°, about 143°, about 144°, about 145°, about 146°, about 147°, about 148°, about 149°, about 150°, about 151°, about 152°, about 153°, about 154°, about 155°, about 156°, about 157°, about 158°, about 159°, about 160°, about 161°, about 162°, about 163°, about 164°, about 165°, about 166°, about 167°, about 168°, about 169°, or about 170°.

The replaceable cutting edge 202 includes a retaining mechanism notch 209*b* configured to receive at least a portion of the retaining pin 205. The retaining mechanism notch 209*b* is disposed along the first longitudinal edge 217*a*, and is further disposed to align with the retaining mechanism notch 209*a* of the rotatable carrier 201. In the specific embodiment shown in FIGS. 12A-12B, the retaining mechanism notch 209*b* is disposed along the portion of the first longitudinal edge 217*a* corresponding to the angled finger 215. In other embodiments, the retaining mechanism notch 209*b* is disposed along the portion of the first longitudinal edge 217*a* corresponding to the angled receiving slot 216. More than one retaining mechanism notch 209*b* may be present along the first longitudinal edge 217*a*.

The first longitudinal edge 217*a* may partially overlap the removal slot 211 of the rotatable carrier 201. In this configuration, the removal slot 211 may serve as a pivot point for prying the replaceable cutting edge 202 away from the rotatable carrier 201.

In some embodiments, the replaceable cutting edge 202 includes a curved outer radius 212 that is approximately equal to, or equal to, the radius of rotation of the rotatable blade 300.

The replaceable cutting edge 202 may have a thickness h that is greater than the thickness 201*t* of the rotatable carrier 201. In these embodiments, the height g of the retaining slot 207 is about the same as (e.g., is only slightly larger than) the thickness 201 *t* of the rotatable carrier 201. Such embodiments do not require removal of material along the long edges 218*a*/218*b* of the rotatable carrier 201 to enable mating with the replaceable cutting edges 202.

The replaceable cutting edge 202 has a thickness h of about 0.15 inches to about 0.6 inches, for example about 0.15 inches, about 0.16 inches, about 0.17 inches, about 0.18 inches, about 0.19 inches, about 0.2 inches, about 0.21 inches, about 0.22 inches, about 0.23 inches, about 0.24 inches, about 0.25 inches, about 0.26 inches, about 0.27 inches, about 0.28 inches, about 0.29 inches, about 0.3 inches, about 0.31 inches, about 0.32 inches, about 0.33 inches, about 0.34 inches, about 0.35 inches, about 0.36 inches, about 0.37 inches, about 0.38 inches, about 0.39 inches, about 0.4 inches, about 0.41 inches, about 0.42 inches, about 0.43 inches, about 0.44 inches, about 0.45 inches, about 0.46 inches, about 0.47 inches, about 0.48 inches, about 0.49 inches, about 0.5 inches, about 0.51 inches, about 0.52 inches, about 0.53 inches, about 0.54 inches, about 0.55 inches, about 0.56 inches, about 0.57 inches, about 0.58 inches, about 0.59 inches, or about 0.6 inches.

In use, the replaceable cutting edge 202 is secured to the rotatable carrier 201 substantially by (or exclusively by) centrifugal force 214 as the rotatable blade 300 rotates about the mounting hole 208.

Referring now to FIGS. 13A-14B, the rotatable blade 300 comprises the rotatable carrier 201 and at least one replaceable cutting edge 202. To mate the components, the replaceable cutting edge 202 is slid onto the long edge 218*a*/218*b* of the rotatable carrier 201 until the long edge 218*a*/218*b* is secured within the receiving slot 207. The direction of sliding is substantially parallel to the angles α,α',β,β' of the angled fingers 203,215 and angled receiving slots 204,216.

In embodiments wherein a retaining pin 205 is also used, the retaining pin 205 is inserted into the retaining mechanism notch 209 formed by the retaining mechanism notch 209*a* of the rotatable carrier 201 and the retaining mechanism notch 209*b* of the replaceable cutting edge 202. In some embodiments, such as those consistent with FIGS. 11A-13C, the notch 209 is disposed along an inner edge portion 204*a* of the angled receiving slot 204 and an inner edge portion 215*a* of the angled finger 215. In other embodiments, such as those consistent with FIGS. 14A-14B, the notch 209 is disposed along an outer edge portion 204*b* of the angled receiving slot 204 and an outer edge portion 215*b* of the angled finger 215. The retaining pin 205 provides additional securing force to retain the replaceable cutting edge 202 to the rotatable carrier 201, for example when centrifugal force 214 is insufficient, on its own, to retain the replaceable cutting edge 202 to the rotatable carrier 201 (e.g., when the rotatable blade 300 is not rotating about the mounting hole 208). In some embodiments, the retaining pin 205 may provide additional benefits, such as a reduction in vibration (e.g., "chatter") between the replaceable cutting edge 202 and the rotatable carrier 201, for example after the replaceable cutting edge 202 has sustained physical damage from collisions with debris while in use. In the embodiment specifically shown in FIGS. 13A-13C, the retaining pin 205 is disposed such that the replaceable cutting edge 202 cannot slide along angle β/β' (see FIGS. 11B and 12B) relative to the rotatable carrier 201 unless and until the retaining pin 205 is removed from retaining mechanism notch 209. In other embodiments, the retaining pin 205 may be a different size and/or shape, and retaining mechanism notches 209*a*/209*b* may be disposed at a different location (e.g., along the interface of the rotatable carrier 201 and the replaceable cutting edge 202) to provide different (e.g., improved or optimized) aerodynamic performance and improved retention of the replaceable cutting edge 202 to the rotatable carrier 201 when physical damage is encountered; for example the retaining pin 205 may be a bolt and optional nut, and the retaining mechanism notches 209*a*/209*b* may be circular or oblong holes through the rotatable carrier 201 and the replaceable cutting edge 202.

Removal of the replaceable cutting edge 202 may be accomplished by sliding the replaceable cutting edge 202 away from the long edge 218*a*/218*b* of the rotatable carrier 201. The direction of sliding is substantially parallel to the angles α,α',β,β' of the angled fingers 203,215 and angled receiving slots 204,216. In some embodiments, for example after substantial use of the rotatable blade 300, removal of the replaceable cutting edge 202 may require prying the replaceable cutting edge 202 away from the rotatable carrier 201. In such embodiments, a tool (e.g., a flathead screwdriver) may be inserted into the removal slot 211 and then pivoted to force the tool against the first longitudinal edge 217*a* of the replaceable cutting edge 202 and away from the rotatable carrier 201.

Rotatable blades 300 consistent with the present disclosure enable quick and economical replacement of cutting edges 202, have considerable longer life before requiring replacement, can cut agricultural mass (e.g., grass, weeds) at least as effectively as a rotating blade without replaceable cutting edges 202, and are adaptable for the many different rotating blade design configurations currently used in the marketplace. This compact design cuts like a standard rotating blade without disrupting the aerodynamic air flow needed for effective cutting and discharge. The replaceable cutting edges 202 can be easily separated during the replacement procedure by using a tool or wedge to pry the replaceable cutting edges loose from the carrier assembly using the aligned removal slot in the rotating carrier. Said replacement cutting edges can only be assembled one way to promote safety during replacement and operation.

In some embodiments, the present disclosure provides a rotatable blade 300 comprising: a carrier portion 201 having a first long edge 218*a* and a first end portion 219*a*; and a replaceable cutting edge 202 removably associated with the first long edge 218*a* and the first end portion 219*a*, the replaceable cutting edge 202 comprising: a retaining slot 207 disposed on a first longitudinal edge 217*a* and configured to removably mate with the first long edge 218*a* of the rotatable carrier portion 201, and a tapered cutting edge 206 disposed along a second longitudinal edge 217*b* opposite the first longitudinal edge 217*a*.

In some embodiments, the present disclosure provides a rotatable carrier 201 comprising: at least one inwardly-angled receiving slot 204 disposed along a first edge 218*a* and configured to receive an outwardly-angled finger 215 of a replaceable cutting edge 202; a removal slot 211 configured to receive a pry tool; and at least one inwardly-angled finger 203 disposed along the first edge 218*a* and configured to reversibly mate with an outwardly-angled receiving slot 216 of the replaceable cutting edge 202. The term "inwardly-angled receiving slot 204" as used herein refers to an orientation of the receiving slot 204 wherein the angle α is acute. The term "outwardly-angled finger 215" as used herein refers to an orientation of the finger 215 wherein the angle β' is acute. The term "inwardly-angled finger 203" as used herein refers to an orientation of the finger 203 wherein the angle α is acute. The term "outwardly-angled receiving slot 216" as used herein refers to an orientation of the receiving slot 216 wherein the angle α' is acute.

In some embodiments, the present disclosure provides a replaceable cutting edge 202 comprising: a tapered cutting edge 206 disposed along a first longitudinal edge 217*b*; a retaining slot 207 along at least a portion of a second longitudinal edge 217*a* opposite the first longitudinal edge 217*b* and configured to reversibly mate with an edge 218*a* of a rotatable carrier 201; and optionally a retaining mechanism notch 209*a* disposed adjacent the second longitudinal edge 217*a* and configured to reversibly receive a retaining mechanism 205.

EXAMPLE

Rotatable blades with replaceable cutting edges according to FIGS. 9-10C, FIGS. 11A-13C, and FIGS. 14A-14B of the present disclosure were tested using a testing protocol similar to the Blade Impact Test ("Peg Test") specified in American Society of Agricultural Engineers S474. To satisfy the ASAE S474 standard, no part of the blade may fail in a hazardous way upon insertion of a 2-inch diameter steel rod into the field of rotation while the blade is rotating at full speed (approx. 19,000 ft/min. at the blade tip).

Results of the testing are shown in Table 1.

TABLE 1

Figure 14A:
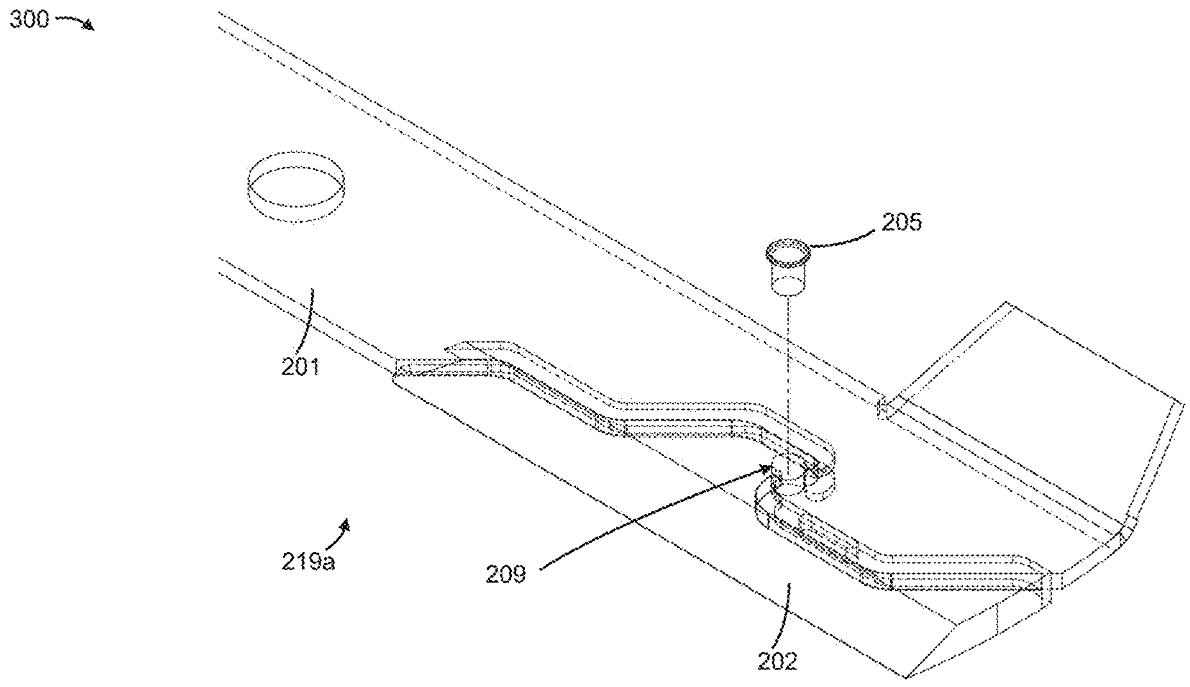
FIG. 14A shows a perspective view of one end of a rotatable blade consistent with another embodiment of the present disclosure, wherein the replaceable cutting edge portion is shown transparently for convenience.
Figure 14B:
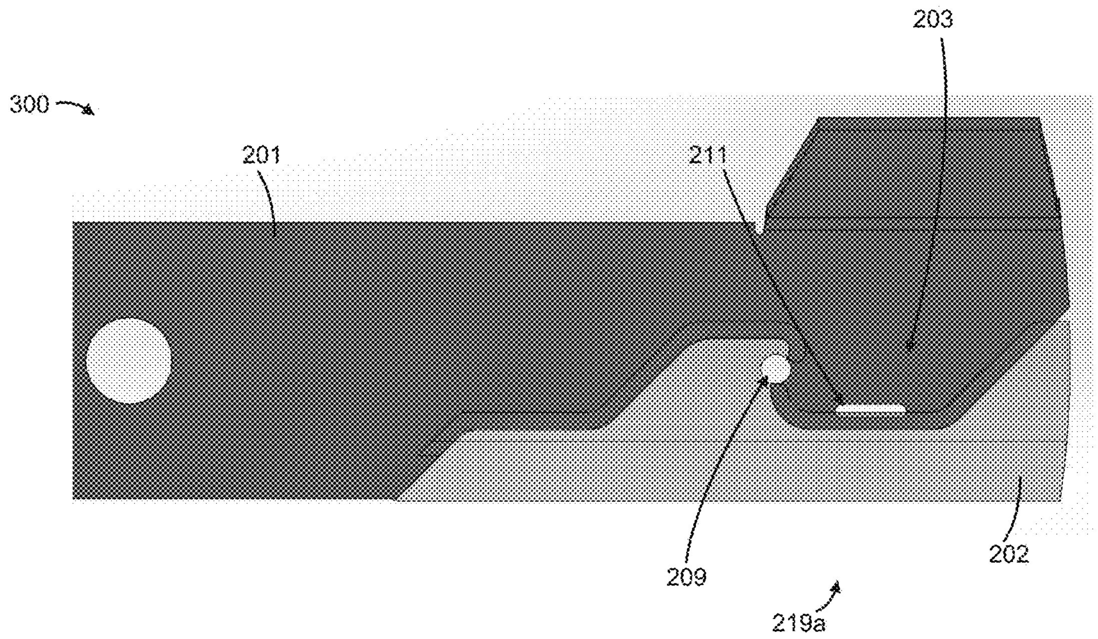
FIG. 14B shows a top plan view of the portion of the rotatable blade of FIG. 14A.

| Embodiment | Pass/Fail |
|---|---|
| FIGS. 9-10C | Pass |
| FIGS. 11A-13C | Fail |
| FIGS. 14A-14B | Pass |

I claim:

1. A rotatable blade comprising:

a carrier portion having a first long edge, and a first end portion including an angled finger; and a replaceable cutting edge removably associated with the first long edge and the first end portion, the replaceable cutting edge comprising:

a retaining slot disposed on a first longitudinal edge and configured to removably mate with the first long edge of the carrier portion, a tapered cutting edge disposed along a second longitudinal edge opposite the first longitudinal edge, and an angled receiving slot disposed along the first longitudinal edge configured to removably mate with the angled finger.

2. The rotatable blade of claim 1, wherein the retaining slot is defined by a top shoulder and a bottom shoulder.

3. The rotatable blade of claim 1, wherein the retaining slot has a height of about 40% to about 65% of a thickness of the replaceable cutting edge.

4. The rotatable blade of claim 1, wherein the replaceable cutting edge has a thickness that is greater than a thickness of the carrier portion.

5. A rotatable carrier comprising:

at least one inwardly-angled receiving slot disposed along a first edge and configured to receive an outwardly-angled finger of a replaceable cutting edge; and at least one inwardly-angled finger disposed along the first edge and configured to reversibly mate with an outwardly-angled receiving slot of the replaceable cutting edge.

6. The rotatable carrier of claim 5 further comprising an air/debris deflector disposed on a trailing edge of the rotatable carrier.

7. The rotatable carrier of claim 5 further comprising a removal slot disposed adjacent to the first edge and configured to receive a pry tool.

8. The rotatable carrier of claim 5, wherein the at least one inwardly-angled receiving slot has an angle/3 relative to a longitudinal axis of the rotatable carrier of about 10° to about 80°.

9. The rotatable carrier of claim 5, wherein the at least one inwardly-angled finger has an angle $\alpha$ relative to a longitudinal axis of the rotatable carrier of about 10° to about 80°.

10. The rotatable carrier of claim 5, wherein the at least one inwardly-angled receiving slot has an angle/3 relative to a longitudinal axis of the rotatable carrier of about 10° to about 80°, and wherein the at least one inwardly-angled finger has an angle $\alpha$ relative to a longitudinal axis of the rotatable carrier of about 10° to about 80°, wherein the angle $\alpha$ and the angle/3 are substantially the same.

11. A replaceable cutting edge comprising:

a tapered cutting edge disposed along a first longitudinal edge;

a retaining slot along at least a portion of a second longitudinal edge opposite the first longitudinal edge and configured to reversibly mate with an edge of a rotatable carrier;

a retaining mechanism notch disposed adjacent the second longitudinal edge and configured to reversibly receive a retaining mechanism; and an angled receiving slot configured to reversibly mate with an angled finger of a rotatable carrier.

12. The replaceable cutting edge of claim 11 further comprising:

an angled finger disposed along the second longitudinal edge; and an angled receiving slot disposed along the second longitudinal edge, wherein the angled finger and the angled receiving slot are configured to reversibly mate with an angled receiving slot and an angled finger, respectively, of the rotatable carrier.

13. The replaceable cutting edge of claim 12, wherein the angled receiving slot has an angle $\beta'$ relative to a longitudinal axis of the replaceable cutting edge of about 10° to about 80°.

14. The replaceable cutting edge of claim 12, wherein the angled finger has an angle $\alpha'$ relative to a longitudinal axis of the replaceable cutting edge of about 10° to about 80°.

15. The replaceable cutting edge of claim 12, wherein the angled receiving slot has an angle $\beta'$ relative to a longitudinal axis of the replaceable cutting edge of about 10° to about 80°, and wherein the angled finger has an angle $\alpha'$ relative to a longitudinal axis of the replaceable cutting edge of about 10° to about 80°, wherein the angle $\alpha'$ and the angle $\beta'$ are substantially the same.

16. The rotatable blade of claim 1 further comprising a retaining mechanism configured to reversibly secure the replaceable cutting edge to the carrier portion.

17. The rotatable carrier of claim 5 further comprising a retaining mechanism configured to reversibly secure the replaceable cutting edge to the rotatable carrier.

* * * * *